(12) United States Patent
Nakagawa

(10) Patent No.: US 11,824,467 B2
(45) Date of Patent: Nov. 21, 2023

(54) ACTUATOR

(71) Applicant: TOYOTA JIDOSHA KABUSHIKI KAISHA, Toyota (JP)

(72) Inventor: Shuji Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/662,001

(22) Filed: May 4, 2022

(65) Prior Publication Data
US 2022/0376634 A1 Nov. 24, 2022

(30) Foreign Application Priority Data

May 21, 2021 (JP) .................... 2021-086358

(51) Int. Cl.
*H02N 1/00* (2006.01)
*H02N 1/06* (2006.01)

(52) U.S. Cl.
CPC .................... *H02N 1/006* (2013.01)

(58) Field of Classification Search
CPC ................ H02N 1/00; H02N 1/006
See application file for complete search history.

(56) References Cited

U.S. PATENT DOCUMENTS

| | | | |
|---|---|---|---|
| 6,184,608 B1 * | 2/2001 | Cabuz | H02N 1/006 310/309 |
| 6,646,364 B1 * | 11/2003 | Horning | H02N 1/006 310/309 |
| 7,154,362 B2 * | 12/2006 | Ohnstein | B25J 9/065 335/229 |
| 8,405,277 B2 * | 3/2013 | Goyal | F03G 7/005 310/331 |
| 11,101,745 B2 * | 8/2021 | Mäkinen | H02N 1/08 |
| 2007/0188582 A1 * | 8/2007 | Cabuz | F04B 43/043 347/112 |
| 2010/0066203 A1 | 3/2010 | Takeuchi et al. | |

FOREIGN PATENT DOCUMENTS

| | | |
|---|---|---|
| JP | H08270615 A | 10/1996 |
| JP | 2010068667 A | 3/2010 |
| JP | 5714200 B2 | 5/2015 |
| JP | 2021132496 A | 9/2021 |
| WO | 0106575 A1 | 1/2001 |

OTHER PUBLICATIONS

Shuji Nakagawa, U.S. Appl. No. 17/597,705, filed Jul. 21, 2020.
Shuji Nakagawa, U.S. Appl. No. 17/492,798, filed Oct. 4, 2021.

* cited by examiner

*Primary Examiner* — Burton S Mullins
(74) *Attorney, Agent, or Firm* — Dickinson Wright, PLLC

(57) ABSTRACT

An actuator has a flexible electrode that has flexibility and a base electrode of which an opposing surface facing the flexible electrode is covered with an insulation layer, and is configured such that, when a voltage is applied between flexible electrode and the base electrode, the flexible electrode deforms so as to approach the opposing surface. The actuator includes a restraining member that restrains the flexible electrode on the base electrode. The flexible electrode has a deforming portion that deforms when a voltage is applied between the electrodes. The deforming portion deforms in a direction of approaching the opposing surface, with the restraining member serving as a support point.

3 Claims, 19 Drawing Sheets

ACTUATOR

CROSS-REFERENCE TO RELATED APPLICATION

This application claims priority to Japanese Patent Application No. 2021-086358 filed on May 21, 2021, incorporated herein by reference in its entirety.

BACKGROUND

1. Technical Field

The disclosure relates to an actuator.

2. Description of Related Art

Soft actuators that perform mechanical work using deformation of a member having flexibility as motive power are known (e.g., Japanese Patent No. 5714200).

SUMMARY

While Japanese Patent No. 5714200 discloses that a dielectric elastomer held between a pair of electrodes deforms, it leaves room for elaboration in terms of how to use this deformation to output the work of the actuator.

Having been contrived in view of this problem, the disclosure aims to provide an actuator that can realize various actions by giving a concrete output form to the work of the actuator.

To solve the above problem, an actuator of the disclosure is an actuator having a flexible electrode that has flexibility and a base electrode of which an opposing surface facing the flexible electrode is covered with an insulation layer, and configured such that, when a voltage is applied between the flexible electrode and the base electrode, the flexible electrode deforms so as to approach the opposing surface. The actuator includes a restraining member that restrains the flexible electrode on the base electrode. The flexible electrode has a deforming portion that deforms when the voltage is applied between the flexible electrode and the base electrode. The deforming portion deforms in a direction of approaching the opposing surface, with the restraining member serving as a support point.

Thus configured, the actuator can output its work by shifting a portion of the flexible electrode other than the deforming portion, another member of the actuator, or a target as the deforming portion of the flexible electrode deforms, or by using a space created as the deforming portion deforms. The actuator can realize various actions that conventional soft actuators have not been able to realize, such as a jumping action, a throwing action, gathering, storing, and discharging actions, catching and releasing actions, tightening and loosening actions, and an action of a pump. Thus, the disclosure can provide an actuator that can realize various actions by giving a concrete output form to its work.

As a more preferred aspect: the opposing surface of the base electrode has a recessed surface part that is depressed in a direction of separating from the flexible electrode; the flexible electrode has a flat plate part that faces the recessed surface part in a state of being tensioned; the restraining member restrains the flexible electrode on the base electrode by fixing an edge of the flat plate part and an edge of the recessed surface part to each other; the flat plate part has the deforming portion; and when the voltage is applied, the deforming portion of the flat plate part deforms in the direction of approaching the recessed surface part, with the restraining member serving as a support point, and when application of the voltage is stopped, the deforming portion deforms beyond the restraining member in a direction of separating from the recessed surface part, with the restraining member serving as a support point.

The actuator having this aspect can use deformation of the deforming portion of the flat plate part to press a surface on which the actuator is placed. This actuator can realize an action of jumping by itself. Thus, with a concrete output form given to its work, this actuator can realize an action like a jumping action that conventional soft actuators have not been able to realize.

As a more preferred aspect: the base electrode has a tube part that is closed at one end and open at the other end; an outer side surface of the tube part is the opposing surface of the base electrode; the restraining member is disposed outward of the outer side surface of the tube part in a radial direction intersecting with an axial direction of the tube part, and restrains the flexible electrode from deforming in the radial direction as well as supports the flexible electrode so as to be slidable along the axial direction; the flexible electrode has a body part that is supported by the restraining member so as to face the outer side surface in a state of being inclined relatively to the outer side surface, and a skirt part that continues to the body part and extends in the axial direction from the restraining member beyond the other end while expanding to the outer side of the restraining member in the radial direction; the body part has the deforming portion; when the voltage is applied, the deforming portion of the body part deforms in a direction of approaching the outer side surface along the radial direction, with the restraining member serving as a support point, so as to pull the skirt part in a direction from the other end toward the one end along the axial direction; and as the body part pulls the skirt part, a leading end of the skirt part shifts toward the inner side in the radial direction, with the restraining member serving as a support point.

The actuator having this aspect can convert deformation of the deforming portion of the body part into a shift of the leading end of the skirt part toward the inner side in the radial direction and use this shift to reduce the area of occupancy of the skirt part. This actuator can realize an action of scraping and gathering a target together by the skirt part. Thus, with a concrete output form given to its work, this actuator can realize an action like a gathering action that conventional soft actuators have not been able to realize.

As a more preferred aspect: the opposing surface of the base electrode has a recessed surface part that is depressed in a direction of separating from the flexible electrode; the flexible electrode has one end surface that faces the recessed surface part and the other end surface that is located on the opposite side from the one end surface; a plurality of rod-shaped members is mounted on the other end surface of the flexible electrode; leading ends of the respective rod-shaped members are disposed at intervals along the other end surface; the restraining member restrains the flexible electrode on the base electrode by fixing an edge of the one end surface and an edge of the recessed surface part to each other; the one end surface has the deforming portion; when the voltage is applied, the deforming portion of the one end surface deforms in a direction of approaching the recessed surface part, with the restraining member serving as a support point; as the one end surface deforms, the other end surface deforms in the direction of approaching the recessed surface part; and as the other end surface deforms, the leading ends of the respective rod-shaped members shift in a direction of reducing the intervals.

The actuator having this aspect can convert deformation of the deforming portion of the one end surface into a shift of the leading ends of the respective rod-shaped members and use this shift to reduce the intervals between the leading ends. This actuator can realize an action of catching a target. Thus, with a concrete output form given to its work, this actuator can realize an action like a catching action that conventional soft actuators have not been able to realize.

As a more preferred aspect: the flexible electrode has an inner circumferential surface that surrounds the periphery of a predetermined axis with a gap left between the inner circumferential surface and the axis in a radial direction intersecting with the axis, and an outer circumferential surface that is disposed outward of the inner circumferential surface in the radial direction; the base electrode is disposed so as to face the outer circumferential surface in the radial direction; the opposing surface of the base electrode has a recessed surface part that is depressed in a direction of separating from the outer circumferential surface; the restraining member restrains the flexible electrode on the base electrode by fixing an edge of the outer circumferential surface and an edge of the recessed surface part to each other; the outer circumferential surface has the deforming portion; when the voltage is applied, the deforming portion of the outer circumferential surface deforms in a direction of approaching the recessed surface part along the radial direction, with the restraining member serving as a support point; and as the outer circumferential surface deforms, the inner circumferential surface shifts in a direction of approaching the recessed surface part along the radial direction so as to increase the gap.

The actuator having this aspect can convert deformation of the deforming portion of the outer circumferential surface into a shift of the inner circumferential surface and use this shift to increase the gap between the inner circumferential surface and the axis. This actuator can realize an action of loosening a tightened target. Thus, with a concrete output form given to its work, this actuator can realize an action like a loosening action that conventional soft actuators have not been able to realize.

As a more preferred aspect: the opposing surface of the base electrode has a recessed surface part that is depressed in a direction of separating from the flexible electrode; the flexible electrode has a flow passage wall that covers the recessed surface part with a gap left between the flow passage wall and the recessed surface part so as to form a flow passage in the gap; the restraining member restrains the flexible electrode on the base electrode by fixing an edge of the flow passage wall and an edge of the recessed surface part to each other; the flow passage wall has the deforming portion; and when the voltage is applied, the deforming portion of the flow passage wall deforms in a direction of approaching the recessed surface part, with the restraining member serving as a support point, so as to reduce the gap.

The actuator having this aspect can use deformation of the deforming portion of the flow passage wall to reduce the gap between the flow passage wall and the recessed surface part and to thereby reduce the volume of the flow passage. This actuator can realize an action of discharging a target from inside the flow passage. Thus, with a concrete output form given to its work, this actuator can realize an action like a discharging action that conventional soft actuators have not been able to realize.

The disclosure can provide an actuator that can realize various actions by giving a concrete output form to its work.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the disclosure will be described below using the drawings. Unless otherwise mentioned, a component that is denoted by the same reference sign in each embodiment has a similar function in each embodiment and therefore will not be repeatedly described.

Embodiment 1

Figure 1:
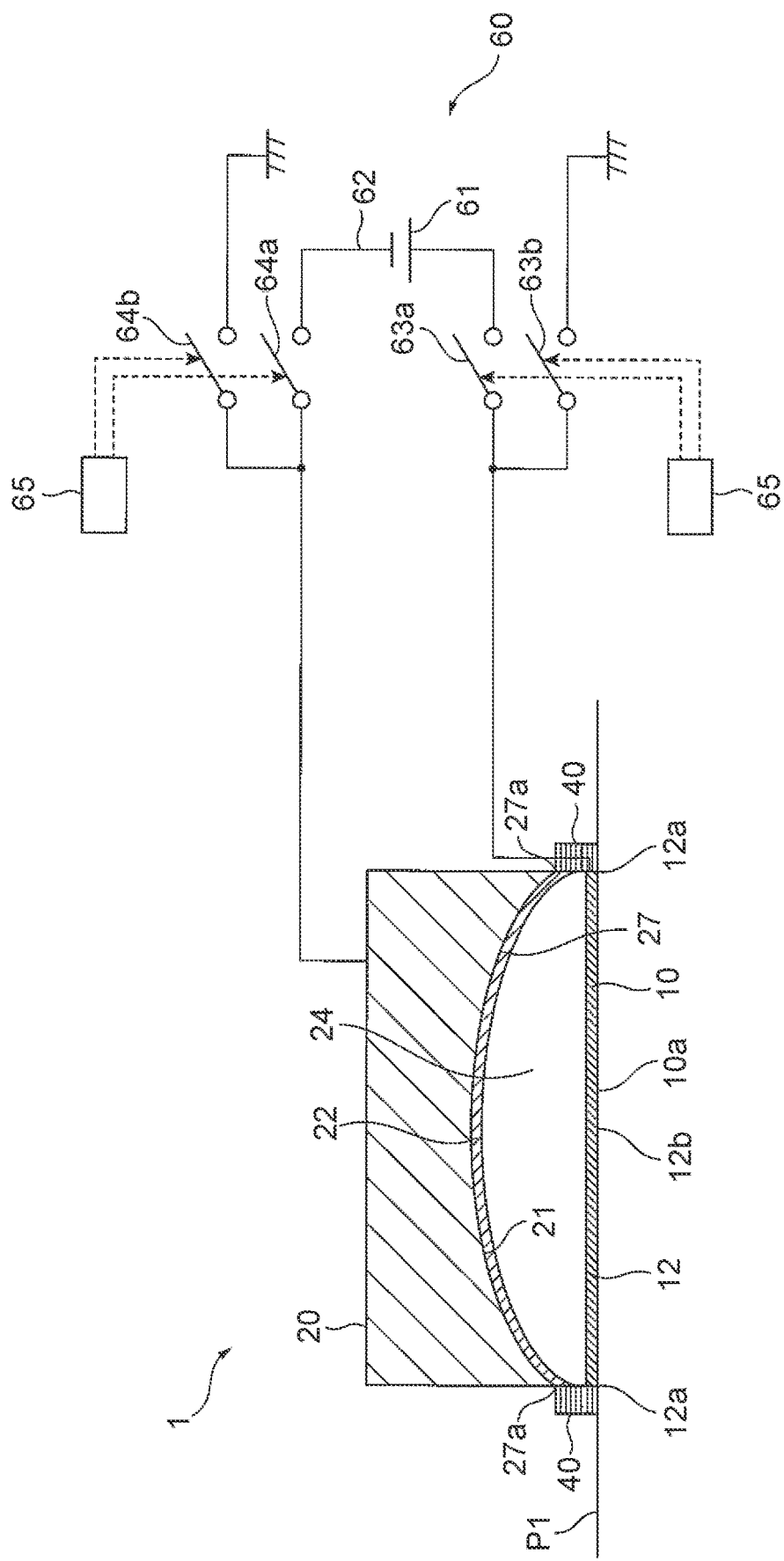
FIG. 1 is a view schematically showing the configuration of an actuator of Embodiment 1.

An actuator 1 of Embodiment 1 will be described using FIG. 1 to FIG. 4. FIG. 1 is a view schematically showing the configuration of the actuator 1 of Embodiment 1.

The actuator 1 is a soft actuator that performs mechanical work using deformation of a flexible electrode 10 having flexibility as motive power. Unlike a conventional soft actuator that uses deformation of a dielectric elastomer held between a pair of electrodes as motive power, the actuator 1 deforms the flexible electrode 10 itself. The actuator 1 can be applied to various types of actuators that are used for various types of industrial machines, robots, and the like.

Figure 2:
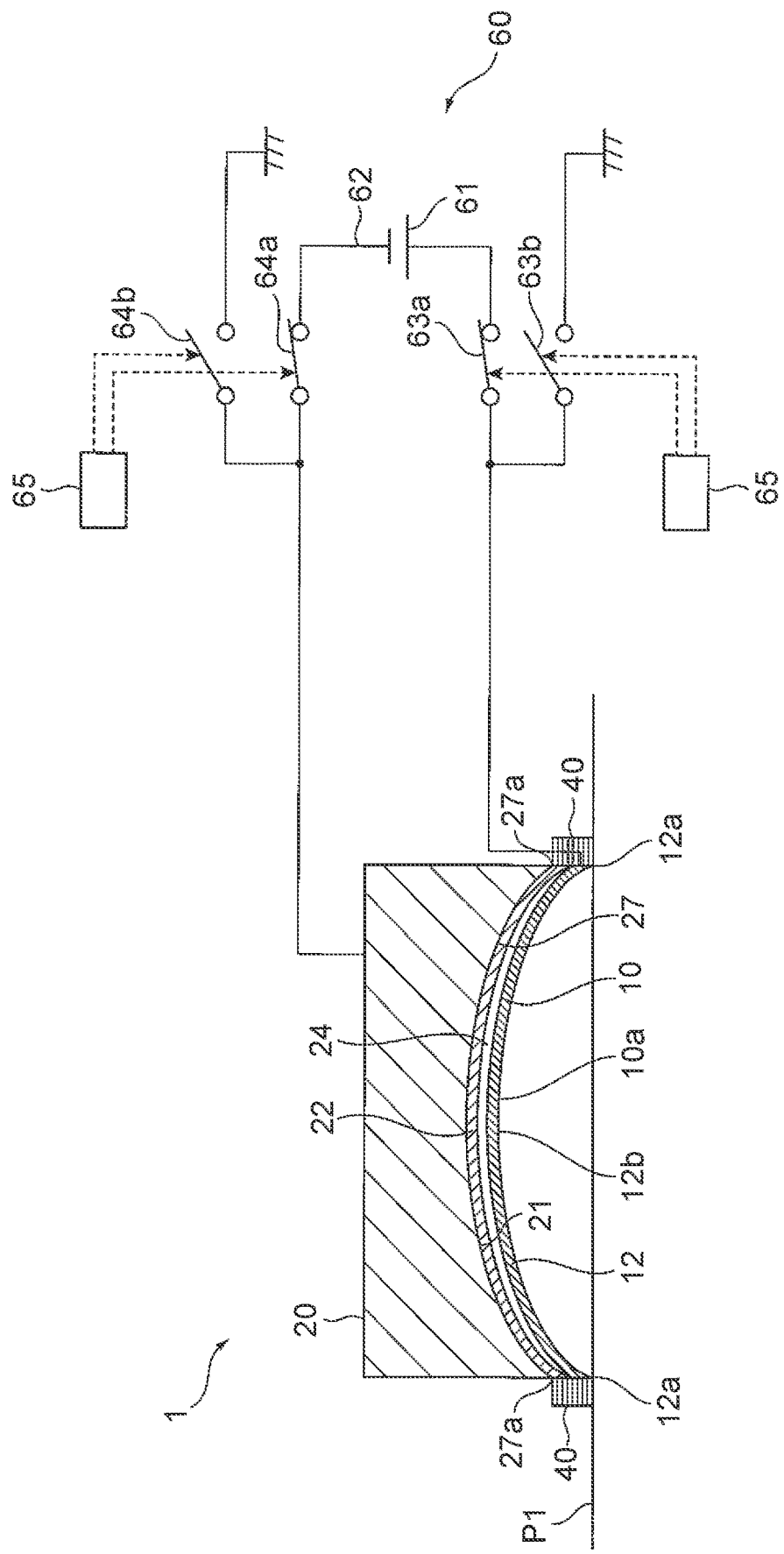
FIG. 2 is a view illustrating the actuator in a case where a voltage is applied between the flexible electrode and the base electrode shown in FIG. 1.

The actuator 1 of Embodiment 1 has the flexible electrode 10 placed on a surface P1 outside the actuator 1 so as to contact the surface P1 (see FIG. 2). The actuator 1 of Embodiment 1 deforms the flexible electrode 10 so as to approach an opposing surface 21 of a base electrode 20 that faces the flexible electrode 10 by means of a Coulomb force that is generated as a voltage is applied between both electrodes, the flexible electrode 10 and the base electrodes 20. Thereafter, the actuator 1 stops application of the voltage between the electrodes to restore the flexible electrode 10 (see FIG. 3). Thus, the actuator 1 can realize an action of jumping on the surface P1. A target for which the work of the actuator 1 of Embodiment 1 is output is the surface P1 on which the actuator 1 is placed.

The actuator 1 includes the flexible electrode 10 having flexibility and the base electrode 20 to which a voltage is applied to generate a Coulomb force for deforming the flexible electrode 10. The actuator 1 further includes restraining members 40 that restrain the flexible electrode 10 on the base electrode 20.

The flexible electrode 10 has a portion that is restrained by the restraining members 40 from deforming in a predetermined direction, and a deforming portion 10a that deforms when a voltage is applied between both electrodes, the flexible electrode 10 and the base electrode 20. When a voltage is applied between these electrodes, the deforming portion 10a deforms in a direction of approaching the opposing surface 21 of the base electrode 20, with the restraining members 40 serving as support points.

The flexible electrode 10 is formed by a conductor having flexibility. The flexibility of the flexible electrode 10 is such that the flexible electrode 10 is deformed by an action of a Coulomb force generated as a voltage is applied between the flexible electrode 10 and the base electrode 20, and restores to its original shape (the shape before deformation, i.e., the shape before the voltage is applied) when application of the voltage is stopped.

The flexible electrode 10 may be formed using a conductive rubber, a conductive gel, or the like. Examples of such conductive rubbers include an elastomer that is molded with a conductive material mixed therein. Examples of such conductive materials include fine powders of carbon black, acetylene black, and carbon nanotube, metal fine powders of silver and copper, and conductor fine powders having a core-shell structure obtained by coating an insulator, such as silica or alumina, with metal by sputtering. Examples of conductive gels include functional gel materials obtained by holding a solvent such as water or a moisturizer, an electrolyte, an additive, etc. inside a three-dimensional polymer matrix. Examples of such functional gel materials include ST-gel® of Sekisui Kasei Co., Ltd. Alternatively, the flexible electrode 10 may be formed by a leaf spring or the like that is formed using a metal material so as to be elastically deformable.

The flexible electrode 10 is formed in a circular or polygonal plate shape. In this embodiment, the flexible electrode 10 is formed in a circular plate shape. The flexible electrode 10 has a flat plate part 12 that faces a recessed surface part 27, to be described later, of the base electrode 20. The flat plate part 12 is fixed by the restraining members 40 so as to face the recessed surface part 27 in a state of being tensioned in directions along the flat plate part 12. The state where the flat plate part 12 is tensioned is a state where the flat plate part 12 is pulled in directions along the flat plate part 12 so as not to sag under its own weight.

The flat plate part 12 has an edge 12a and a main portion 12b that is a portion of the flat plate part 12 other than the edge 12a. The edge 12a of the flat plate part 12 is fixed to an edge 27a of the recessed surface part 27 by the restraining members 40. By being fixed by the restraining members 40, the edge 12a of the flat plate part 12 is restrained from deforming in directions along the flat plate part 12 as well as in directions intersecting with the flat plate part 12. The directions intersecting with the flat plate part 12 include directions of approaching and separating from the recessed surface part 27 of the opposing surface 21 of the base electrode 20.

The main portion 12b of the flat plate part 12 is a portion of the flat plate part 12 that is not fixed by the restraining members 40. The main portion 12b of the flat plate part 12 is not restrained from deforming in the directions of approaching and separating from the recessed surface part 27. The main portion 12b of the flat plate part 12 is the deforming portion 10a of the flexible electrode 10. When a voltage is applied between the flexible electrode 10 and the base electrode 20, the main portion 12b of the flat plate part 12 deforms in the direction of approaching the recessed surface part 27, with the restraining members 40 serving as support points. When application of the voltage is stopped, the main portion 12b of the flat plate part 12 that is the deforming portion 10a deforms beyond the restraining members 40 in the direction of separating from the recessed surface part 27, with the restraining members 40 serving as support points.

The base electrode 20 is formed by a conductor having rigidity. Examples of materials used to form the base electrode 20 include metal materials, such as iron, copper, and aluminum. Alternatively, the base electrode 20 may be formed by covering, with a conductive metal film or the like, a surface of a substrate that is formed using a non-metal material having heat resistance, rigidity, and insulating properties, such as ceramic. The surface of the substrate that is covered with the metal film is a surface facing the flexible electrode 10.

The opposing surface 21 of the base electrode 20 facing the flexible electrode 10 is covered with an insulation layer 22. The insulation layer 22 is formed using a ferroelectric substance composed of ceramic such that electrical charge accumulated in the base electrode 20 as a result of application of a voltage between the base electrode 20 and the flexible electrode 10 is reliably maintained. In particular, the insulation layer 22 is formed using a ferroelectric substance having a perovskite structure. Examples of ferroelectric substances having a perovskite structure include barium titanate ($BaTiO_3$), lead titanate ($PbTiO_3$), lead zirconate titanate ($Pb(Zr, Ti)O_3$), lead lanthanum zirconate titanate ($(Pb, La)(Zr, Ti)O_3$), strontium titanate ($SrTiO_3$), barium strontium titanate ($(Ba, Sr)TiO_3$), and potassium sodium niobate ($(Nak)NbO_3$). Barium titanate may contain a substance such as $CaZrO_3$ or $BaSnO_3$ as a solid solution.

It is preferable that the material used to form the insulation layer 22 be a material having such a high dielectric constant that a Coulomb force to deform the flexible electrode 10 can be generated. The dielectric constant of the insulation layer 22 may be, for example, 1000 or higher by adopting ceramic (fine ceramic). Barium titanate has a dielectric constant of around 1000 to 10000. Lead zirconate titanate has a dielectric constant of 500 to 5000. Strontium titanate has a dielectric constant of 200 to 500. These ferroelectric substances having a perovskite structure are materials having high dielectric constants.

The base electrode 20 is formed in a columnar shape or a polygonal columnar shape. From the viewpoint of weight reduction, the base electrode 20 may be formed so as to have a hollow structure. In this embodiment, the base electrode 20 is formed in a columnar shape. A bottom surface on one side of the base electrode 20 is the opposing surface 21 facing the flexible electrode 10. The opposing surface 21 of the base electrode 20 has the recessed surface part 27 that is depressed in the direction of separating from the flexible electrode 10. The recessed surface part 27 is formed at such a position as to face the flat plate part 12 of the flexible electrode 10. The recessed surface part 27 is formed in a shape corresponding to the shape of the flat plate part 12 of the flexible electrode 10. In this embodiment, the recessed surface part 27 may be formed by a curved surface, such as a hemispherical surface. A space 24 is formed between the recessed surface part 27 and the flat plate part 12, i.e., between the base electrode 20 and the flexible electrode 10. The space 24 is a space to receive the flexible electrode 10 that deforms so as to approach the opposing surface 21 of the base electrode 20 when a voltage is applied between the flexible electrode 10 and the base electrode 20.

The restraining members 40 restrain the flexible electrode 10 on the base electrode 20 by fixing the edge 12a of the flat plate part 12 of the flexible electrode 10 and an edge 27a of the recessed surface part 27 of the base electrode 20 to each other. The restraining members 40 support the edge 12a of the flat plate part 12 as a fixed end. The restraining members 40 are formed by insulators. The restraining members 40 may be formed by fixing parts such as brackets or joints, fasteners such as screws, adhesives, or the like.

The actuator 1 is connected to a drive circuit 60 that drives the actuator 1 by applying a voltage between the flexible electrode 10 and the base electrode 20.

The drive circuit 60 includes: a power source 61 formed by a direct-current voltage source or the like; wiring 62 that connects components of the drive circuit 60 to the flexible electrode 10 and the base electrode 20; switches 63a to 64b formed by semiconductor devices or the like; and control units 65 formed by integrated circuits or the like.

The flexible electrode 10 is connected by the wiring 62 to one of a positive electrode and a negative electrode of the power source 61 and to a frame ground (or the ground). The base electrode 20 is connected by the wiring 62 to the other of the positive electrode and the negative electrode of the power source 61 and to the frame ground. The switch 63a is connected between the flexible electrode 10 and the power source 61. The switch 63b is connected between the flexible electrode 10 and the frame ground. The switch 64a is connected between the base electrode 20 and the power source 61. The switch 64b is connected between the base electrode 20 and the frame ground.

The control units 65 are circuits that control the components of the drive circuit 60. The control units 65 switch between applying a voltage between the flexible electrode 10 and the base electrode 20 and stopping the application by controlling ON and OFF states of the switches 63a to 64b. The control units 65 can control the magnitude of a voltage to be applied by controlling the magnitude of an output voltage of the power source 61. Thus, the control units 65 can control the magnitude of a Coulomb force acting on the flexible electrode 10 and thereby control the amount of deformation of the flexible electrode 10. Further, the control units 65 can control the speed of deformation of the flexible electrode 10 by controlling the speed of switching between applying a voltage and stopping the application. In addition, the control units 65 can control the timing of deformation of the flexible electrode 10 by controlling the timing of switching between applying a voltage and stopping the application.

Figure 3:
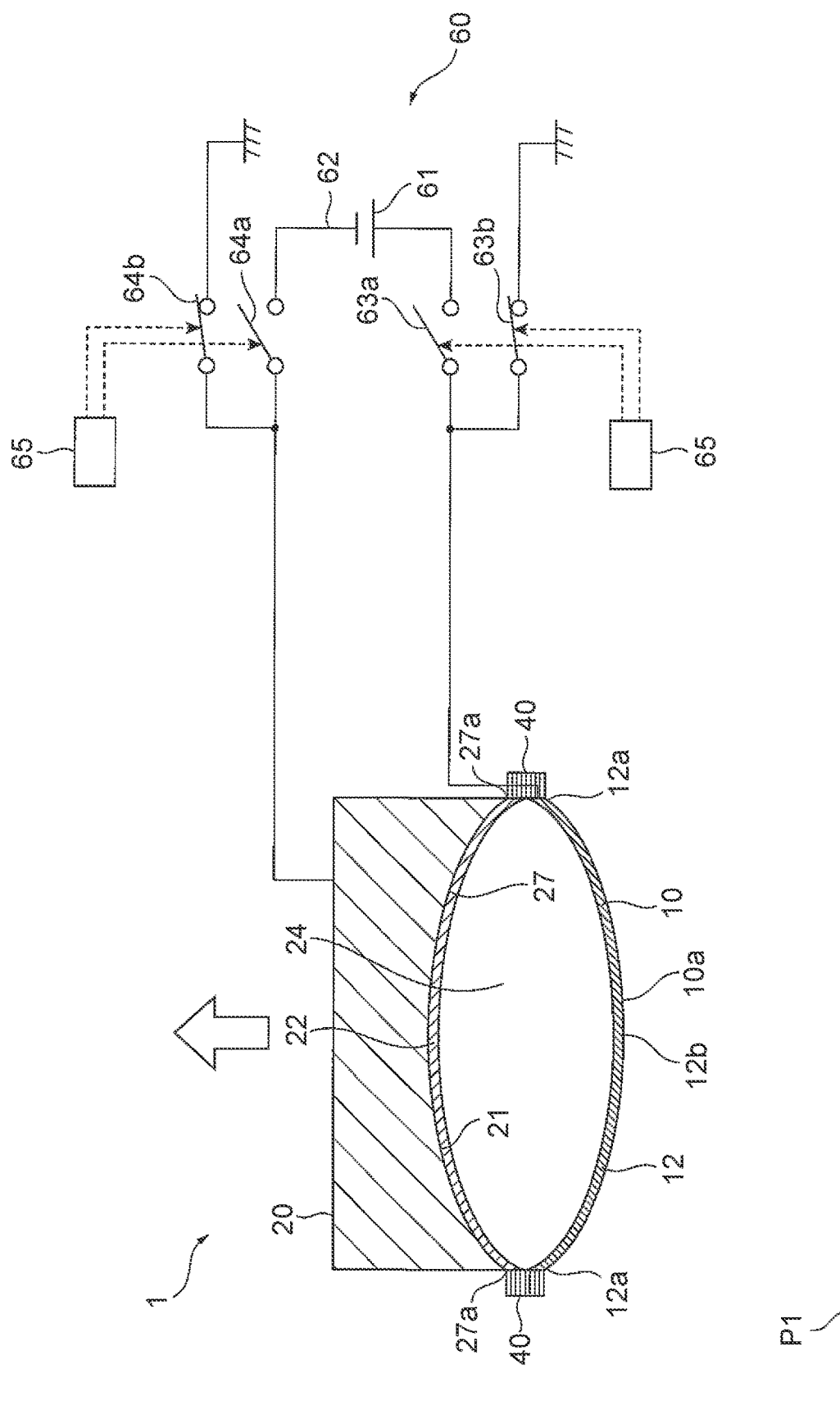
FIG. 3 is a view illustrating the actuator in a case where application of the voltage is stopped after the case shown in FIG. 2.

FIG. 2 is a view illustrating the actuator 1 in a case where a voltage is applied between the flexible electrode 10 and the base electrode 20 shown in FIG. 1. FIG. 3 is a view illustrating the actuator 1 in a case where application of the voltage is stopped after the case shown in FIG. 2.

As shown in FIG. 2, the control units 65 of the drive circuit 60 control the switches 63a, 64a to the ON state and control the switches 63b, 64b to the OFF state. Then, a voltage is applied between the flexible electrode 10 and the base electrode 20. In this case, the flexible electrode 10 connected to the positive electrode of the power source 61 assumes positive electrical charge and the base electrode 20 connected to the negative electrode of the power source 61 assumes negative electrical charge. The insulation layer 22 covering the opposing surface 21 of the base electrode 20 undergoes dielectric polarization. In the insulation layer 22, a part near an interface with the opposing surface 21 assumes positive electrical charge, while a part near a surface on the opposite side from the interface (on the side of the space 24) assumes negative electrical charge. A Coulomb force is generated between the insulation layer 22 and the flexible electrode 10. Due to this Coulomb force, the flexible electrode 10 is attracted to the insulation layer 22. Specifically, due to the Coulomb force, the flat plate part 12 of the flexible electrode 10 deforms so as to approach the recessed surface part 27 of the opposing surface 21 of the base electrode 20. The main portion 12b of the flat plate part 12 that is the deforming portion 10a deforms in the direction of approaching the recessed surface part 27, with the restraining members 40 serving as support points.

After the case shown in FIG. 2, the control units 65 of the drive circuit 60 control the switches 63b, 64b to the ON state and control the switches 63a, 64a to the OFF state as shown in FIG. 3. Then, application of the voltage between the flexible electrode 10 and the base electrode 20 stops. In this case, the electrical charge accumulated between the flexible electrode 10 and the base electrode 20 is released to the frame ground. Due to a restoring force of the flexible electrode 10, the flexible electrode 10 deforms so as to separate from the opposing surface 21 of the base electrode 20. Specifically, due to the restoring force, the flat plate part 12 of the flexible electrode 10 deforms so as to separate from the recessed surface part 27 of the opposing surface 21 of the base electrode 20. Here, in an initial stage shown in FIG. 1 before the voltage is applied, the flat plate part 12 is fixed in the state of being tensioned as described above. In the case shown in FIG. 3, therefore, the flat plate part 12 deforms so as to separate farther from the recessed surface part 27 than in the initial stage shown in FIG. 1. The main portion 12b of the flat plate part 12 that is the deforming portion 10a deforms beyond the restraining members 40 in the direction of separating from the recessed surface part 27, with the restraining members 40 serving as support points. Thus, the main portion 12b of the flat plate part 12 that is the deforming portion 10a can press the surface P1 on which the actuator 1 is placed. The actuator 1 can jump up from the surface P1 by a reaction force against pressing by the main portion 12b of the flat plate part 12 that is the deforming portion 10a.

Thus, the actuator 1 can realize an action of jumping by itself by using deformation of the deforming portion 10*a* of the flat plate part 12 to press the surface P1 on which the actuator 1 is placed. The deforming portion 10*a* of the flat plate part 12 can function as an output part that outputs the work of the actuator 1 to the outside. With a concrete output form given to its work, the actuator 1 of Embodiment 1 can realize an action like a jumping action that conventional soft actuators have not been able to realize.

Figure 4:
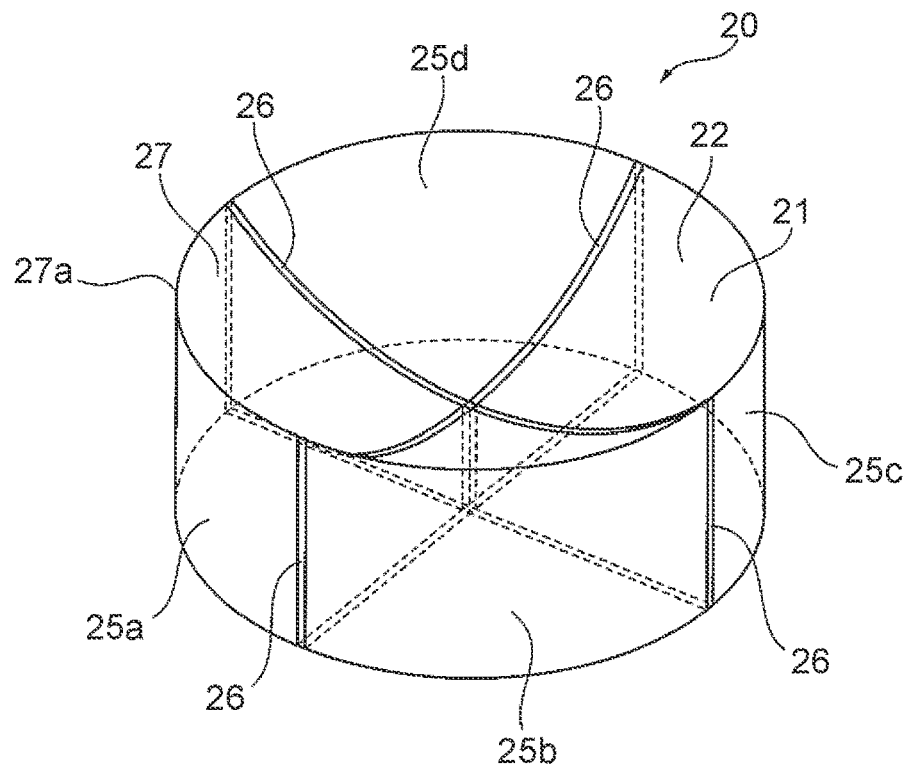
FIG. 4 is a view illustrating another example of the base electrode shown in FIG. 1.

FIG. 4 is a view illustrating another example of the base electrode 20 shown in FIG. 1. In FIG. 4, the insulation layer 22 is not shown.

As shown in FIG. 4, the base electrode 20 of Embodiment 1 may be divided into a plurality of electrode parts 25*a* to 25*d* by dividing the recessed surface part 27 of the opposing surface 21 of the base electrode 20. The number of electrode parts into which the base electrode 20 is divided is arbitrary. The electrode parts 25*a* to 25*d* are insulated from one another by plate-shaped insulation parts 26. The plate-shaped insulation parts 26 allow a voltage to be individually applied between each of the electrode parts 25*a* to 25*d* and the flexible electrode 10. The control units 65 of the drive circuit 60 can control the magnitude of a voltage to be applied to each of the electrode parts 25*a* to 25*d* and control the timings of applying a voltage and stopping the application. Thus, the flexible electrode 10 can deform into various forms according to which of the electrode parts 25*a* to 25*d* a voltage is applied to. Therefore, the actuator 1 of Embodiment 1 can jump up from the surface P1 with an arbitrary force, in an arbitrary direction, and at an arbitrary timing.

Embodiment 2

An actuator 1 of Embodiment 2 will be described using FIG. 5 and FIG. 6. Description of components and actions of the actuator 1 of Embodiment 2 that are the same as in the foregoing embodiment will be omitted.

Figure 5:
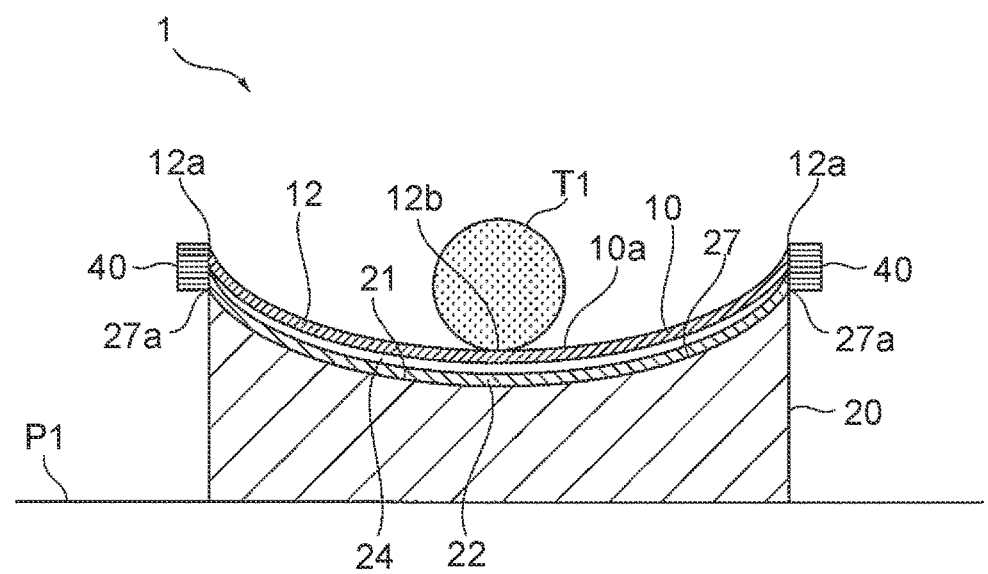
FIG. 5 is a view schematically showing the configuration of an actuator of Embodiment 2.
Figure 6:
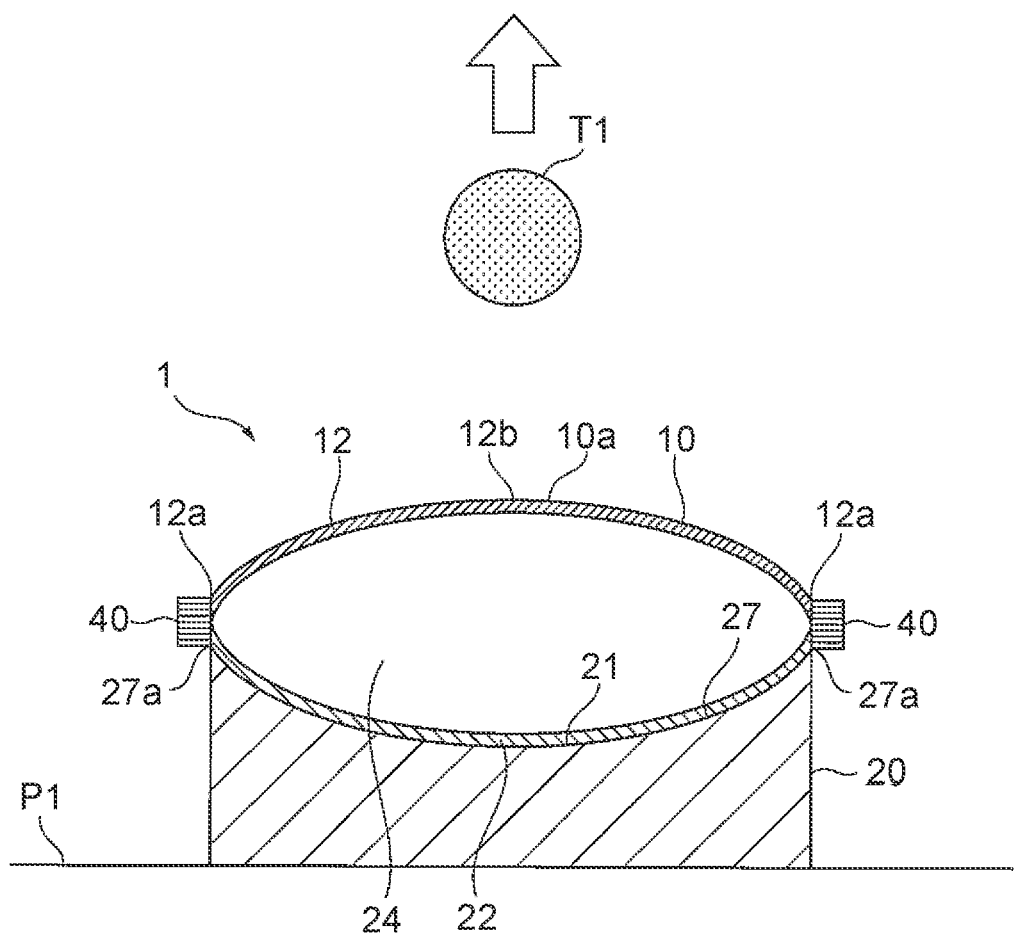
FIG. 6 is a view illustrating the actuator in a case where application of a voltage between the flexible electrode and the base electrode shown in FIG. 5 is stopped.

FIG. 5 is a view schematically showing the configuration of the actuator 1 of Embodiment 2. FIG. 5 shows a case where a voltage is applied between a flexible electrode 10 and a base electrode 20. FIG. 6 is a view illustrating the actuator 1 in a case where application of the voltage between the flexible electrode 10 and the base electrode 20 shown in FIG. 5 is stopped. In FIG. 5 and FIG. 6, a drive circuit 60 is not shown.

The actuator 1 of Embodiment 1 has the flexible electrode 10 placed on the surface P1 so as to contact the surface P1. The target for which the work of the actuator 1 of Embodiment 1 is output is the surface P1 on which the actuator 1 is placed. The actuator 1 of Embodiment 1 realizes an action of jumping by itself by using deformation of the deforming portion 10*a* of the flat plate part 12 to press the surface P1 on which the actuator 1 is placed.

On the other hand, the actuator 1 of Embodiment 2 has the base electrode 20 placed on a surface P1 so as to contact the surface P1. The base electrode 20 of Embodiment 2 may be fixed to the surface P1 so as not to move in a direction intersecting with the surface P1. A target for which the work of the actuator 1 of Embodiment 2 is output is a target T1 that is placed on the flexible electrode 10 as shown in FIG. 5 and FIG. 6. The actuator 1 of Embodiment 2 can realize an action of throwing the target T1 by using deformation of a deforming portion 10*a* of a flat plate part 12 to flick off the target T1. With a concrete output form given to its work, the actuator 1 of Embodiment 2 can realize an action like a throwing action that conventional soft actuators have not been able to realize.

Like the base electrode 20 shown in FIG. 4, the base electrode 20 of Embodiment 2 may be divided into a plurality of electrode parts 25*a* to 25*d* to which a voltage is individually applied. The actuator 1 of Embodiment 2 can throw the target T1 with an arbitrary force, in an arbitrary direction, and at an arbitrary timing similarly to that of Embodiment 1.

Embodiment 3

An actuator 1 of Embodiment 3 will be described using FIG. 7 to FIG. 12. Description of components and actions of the actuator 1 of Embodiment 3 that are the same as in the foregoing embodiments will be omitted.

Figure 7:
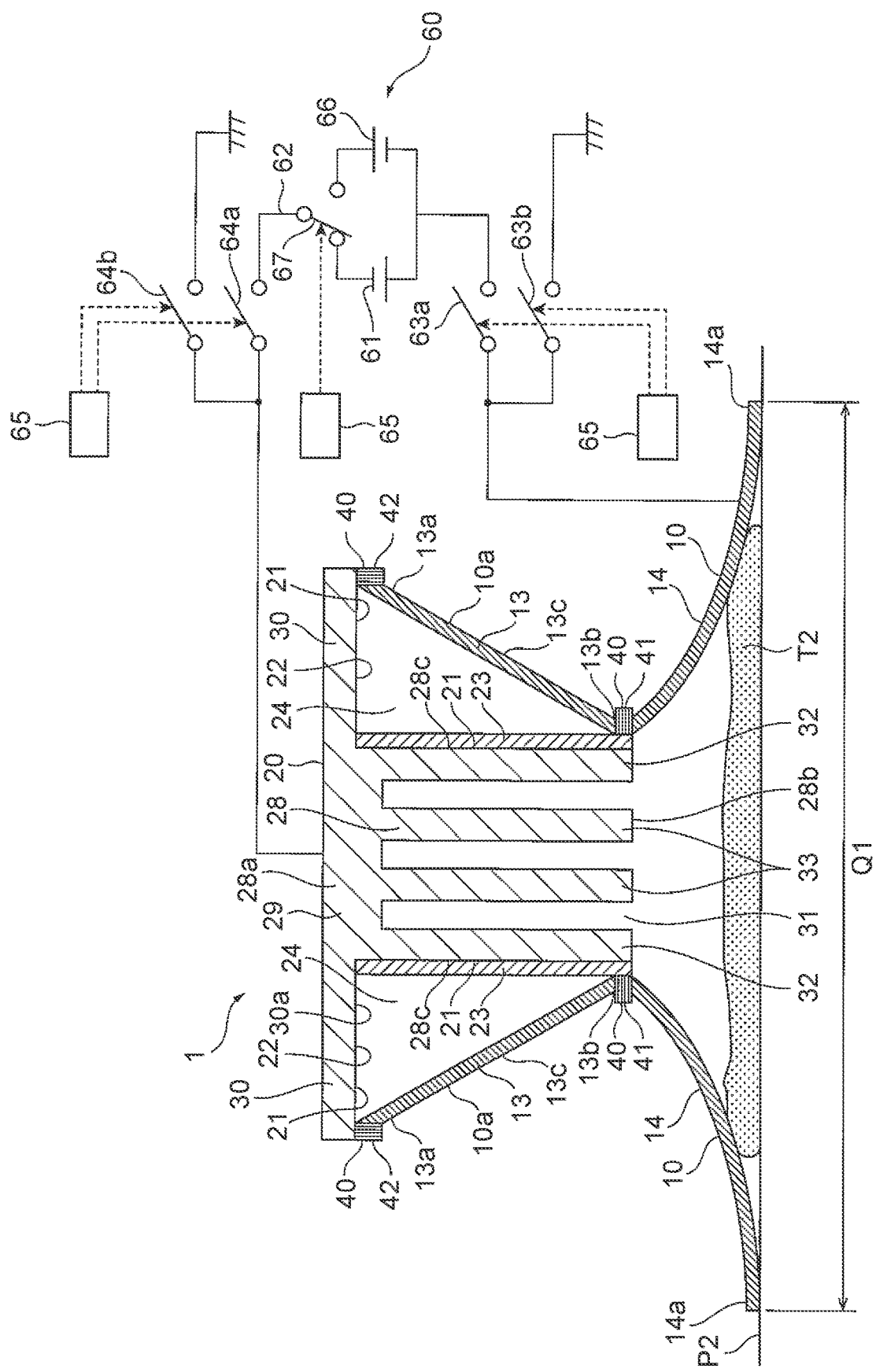
FIG. 7 is a view schematically showing the configuration of an actuator of Embodiment 3.

FIG. 7 is a view schematically showing the configuration of the actuator 1 of Embodiment 3. In FIG. 7, an insulation layer 22 covering an opposing surface 21 of a base electrode 20 is not shown. The insulation layer 22 is not shown also in FIG. 8 to FIG. 20.

The actuator 1 of Embodiment 3 is disposed over a target T2. The target T2 is a liquid, a powder, or the like on a surface P2 outside the actuator 1. By applying a voltage between both electrodes, a flexible electrode 10 and the base electrode 20, the actuator 1 of Embodiment 3 shifts a skirt part 14, to be described later, of the flexible electrode 10 toward an inner side in a radial direction of a tube part 28, to be described later, of the base electrode 20 (see FIG. 8). Thus, the actuator 1 of Embodiment 3 can realize an action of gathering the target T2. A target for which the work of the actuator 1 of Embodiment 3 is output is the target T2 on the surface P2.

The base electrode 20 of Embodiment 3 has the tube part 28 of which one end 28*a* is closed and the other end 28*b* is open. The tube part 28 has a hollow structure and is formed in a cylindrical shape or a polygonal tubular shape. The tube part 28 is formed such that a section along an axial direction of the tube part 28 has a shape of comb teeth. The tube part 28 has a bottom 29, a flange 30, openings 31, an outer wall 32, and an inner wall 33.

The bottom 29 is provided at the one end 28*a* of the tube part 28 and closes the one end 28*a*. The bottom 29 may have a hole through which air inside the tube part 28 is discharged from the one end 28*a* to an outside of the tube part 28. The bottom 29 extends in the radial direction of the tube part 28. The radial direction of the tube part 28 is a direction that intersects (orthogonally) with the axial direction of the tube part 28 that is an extension direction of a central axis of the tube part 28. The flange 30 extends from the bottom 29 toward an outer side in the radial direction of the tube part 28. The outer side in the radial direction of the tube part 28 is a side toward the outside of the tube part 28 in the radial direction of the tube part 28. The flange 30 has a lower surface 30*a* that continues to an outer side surface 28*c* of the tube part 28. The lower surface 30*a* extends along the radial direction of the tube part 28 and intersects (orthogonally) with the axial direction of the tube part 28.

The outer side surface 28*c* of the tube part 28 extends along the axial direction of the tube part 28 and intersects (orthogonally) with the radial direction of the tube part 28.

The outer wall 32 and the inner wall 33 extend in the axial direction of the tube part 28 from the bottom 29 to the openings 31. The outer wall 32 forms the outer side surface 28*c* of the tube part 28. The inner wall 33 is disposed with a gap left from the outer wall 32 toward the inner side in the radial direction. The outer wall 32 and the inner wall 33 may be formed in cylindrical shapes or polygonal tubular shapes having a common central axis. The openings 31 are formed by a leading end of the outer wall 32 and a leading end of the inner wall 33 as well as by the leading end of the inner wall 33 alone. The leading end of the outer wall 32 and the leading end of the inner wall 33 are respectively an end of the outer wall 32 and an end of the inner wall 33 that are located on the opposite side from the bottom 29 in the axial direction.

As will be described later, the opposing surface 21 of the base electrode 20 of Embodiment 3 is formed by the outer side surface 28c of the tube part 28 and the lower surface 30a of the flange 30. The lower surface 30a of the flange 30 is covered with the insulation layer 22 as in Embodiment 1. The outer side surface 28c of the tube part 28 is covered with an insulation layer 23 that is sufficiently thicker than the insulation layer 22. In a case where the target T2 is a conductive liquid, such as water or an electrolyte, not only the lower surface 30a of the flange 30 but also an inner surface of the tube part 28 (an inner surface and a leading end surface of the outer wall 32, inner and outer surfaces and a leading end surface of the inner wall 33, and a lower surface of the bottom 29) is also covered with the insulation layer 22.

The restraining members 40 of Embodiment 3 include first restraining members 41 and second restraining members 42. The first restraining members 41 are disposed outward of the outer side surface 28c of the tube part 28 in the radial direction of the tube part 28. The first restraining members 41 are mounted on the insulation layer 23 covering the outer side surface 28c, at positions near the leading end of the outer wall 32. The first restraining members 41 restrain the flexible electrode 10 from deforming in the radial direction of the tube part 28. The first restraining members 41 support the flexible electrode 10 so as to be slidable along the axial direction of the tube part 28. Specifically, the first restraining members 41 support a leading end 13b of a body part 13 of the flexible electrode 10 so as to be slidable along the axial direction of the tube part 28 and restrain the leading end 13b from deforming in the radial direction. Thus, the first restraining members 41 restrain the flexible electrode 10 on the base electrode 20 in the radial direction of the tube part 28.

The second restraining members 42 are disposed outward of the first restraining members 41 in the radial direction of the tube part 28. The second restraining members 42 are mounted on the insulation layer 22 covering the lower surface 30a, at positions near an edge of the flange 30. The second restraining members 42 restrain the flexible electrode 10 on the base electrode 20 by fixing a base end 13a of the body part 13 of the flexible electrode 10 and the edge of the flange 30 to each other. The second restraining members 42 support the base end 13a of the body part 13 as a fixed end. The second restraining members 42 may be formed similarly to the restraining members 40 of Embodiment 1.

The flexible electrode 10 of Embodiment 3 is formed in a shape of a band or a plate covering the periphery of the tube part 28 of the base electrode 20. The flexible electrode 10 has the body part 13 and the skirt part 14. The body part 13 is a part of the flexible electrode 10 from the first restraining members 41 and extends in a direction from the other end 28b toward the one end 28a of the tube part 28. The body part 13 is disposed between the first restraining members 41 and the second restraining members 42. The body part 13 has the base end 13a and the leading end 13b that are located on the side of the one end 28a and on the side of the other end 28b, respectively, in the axial direction of the tube part 28, and a main portion 13c that is a portion other than the base end 13a and the leading end 13b. The base end 13a of the body part 13 is a portion that is fixed by the second restraining members 42. The leading end 13b of the body part 13 is a portion that is supported by the first restraining members 41. The main portion 13c of the body part 13 is a portion that is not supported or fixed by the first restraining members 41 or the second restraining members 42. The main portion 13c of the body part 13 is a deforming portion 10a of the flexible electrode 10.

The body part 13 is supported by the first restraining members 41 and the second restraining members 42 so as to face each of the outer side surface 28c of the tube part 28 and the lower surface 30a of the flange 30 in a state of being inclined relatively to each of the outer side surface 28c and the lower surface 30a. The outer side surface 28c of the tube part 28 and the lower surface 30a of the flange 30 are the opposing surface 21 of the base electrode 20 that faces the flexible electrode 10. A space 24 is formed between the outer side surface 28c of the tube part 28 and the lower surface 30a of the flange 30 on one side and the body part 13 on the other side to receive the flexible electrode 10 that deforms so as to approach the opposing surface 21 of the base electrode 20 when a voltage is applied between the flexible electrode 10 and the base electrode 20.

The skirt part 14 is a part of the flexible electrode 10 from the first restraining members 41 and extends in a direction from the one end 28a toward the other end 28b of the tube part 28. The skirt part 14 continues to the leading end 13b of the body part 13. The skirt part 14 covers the target T2 placed on the surface P2. The skirt part 14 extends in the axial direction from the first restraining members 41 beyond the other end 28b while expanding to the outer side of the first restraining members 41 in the radial direction of the tube part 28. A leading end 14a of the skirt part 14 contacts the surface P2.

Compared with the drive circuit 60 of Embodiment 1, the drive circuit 60 of Embodiment 3 additionally has a power source 66 and a switch 67. The power source 66 is connected in parallel to and in the opposite direction from the power source 61. The switch 67 is connected between the power source 61 and the power source 66 on one side and a switch 63a on the other side, or between the power source 61 and the power source 66 on one side and a switch 64a on the other side. The switch 67 is a switch that switches between applying an output voltage of the power source 61 and applying an output voltage of the power source 66 as a voltage to be applied between the flexible electrode 10 and the base electrode 20. The switch 67 is controlled by a control unit 65.

Figure 8:
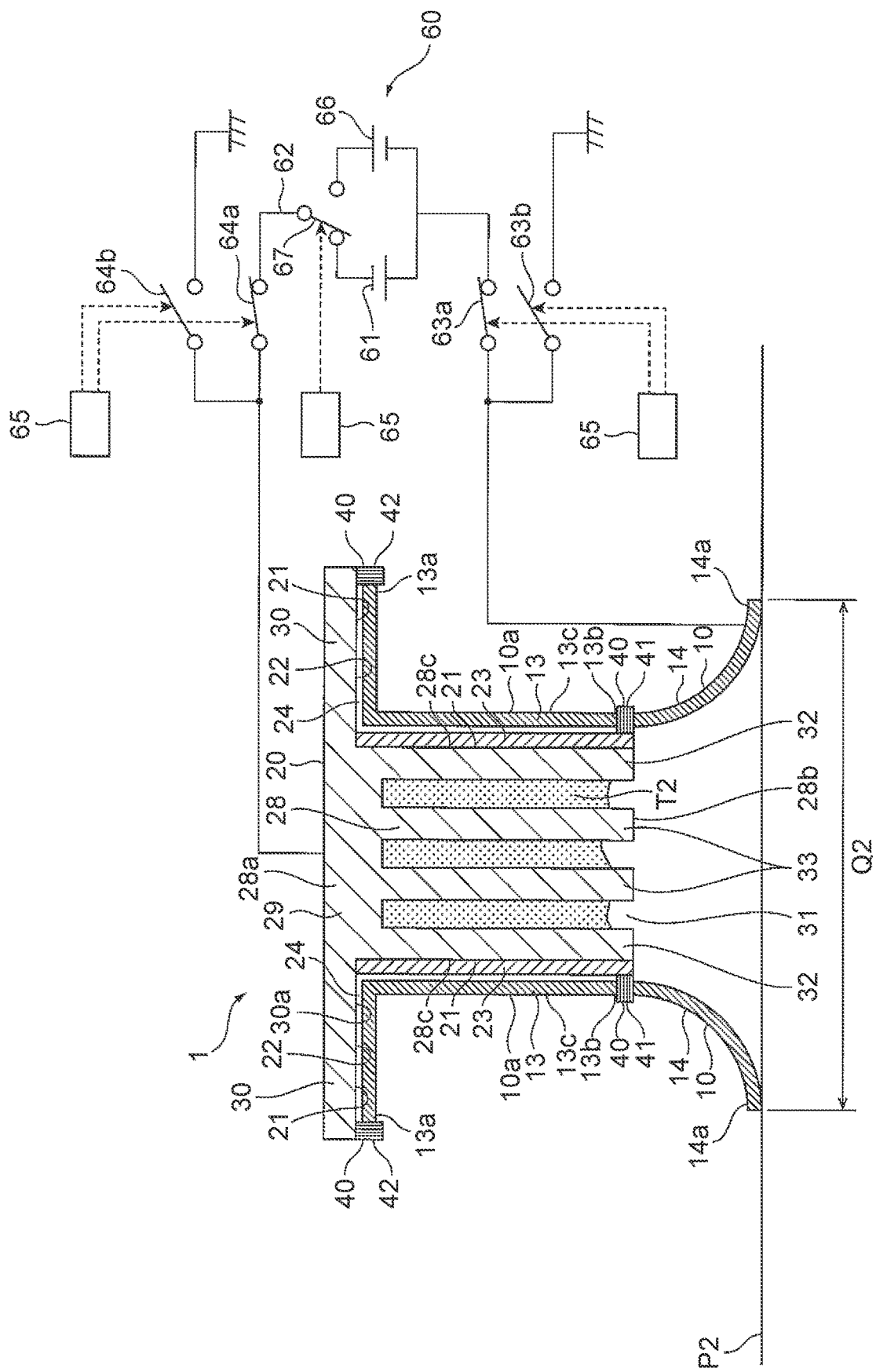
FIG. 8 is a view illustrating the actuator in a case where a voltage is applied between the flexible electrode and the base electrode shown in FIG. 7.
Figure 9:
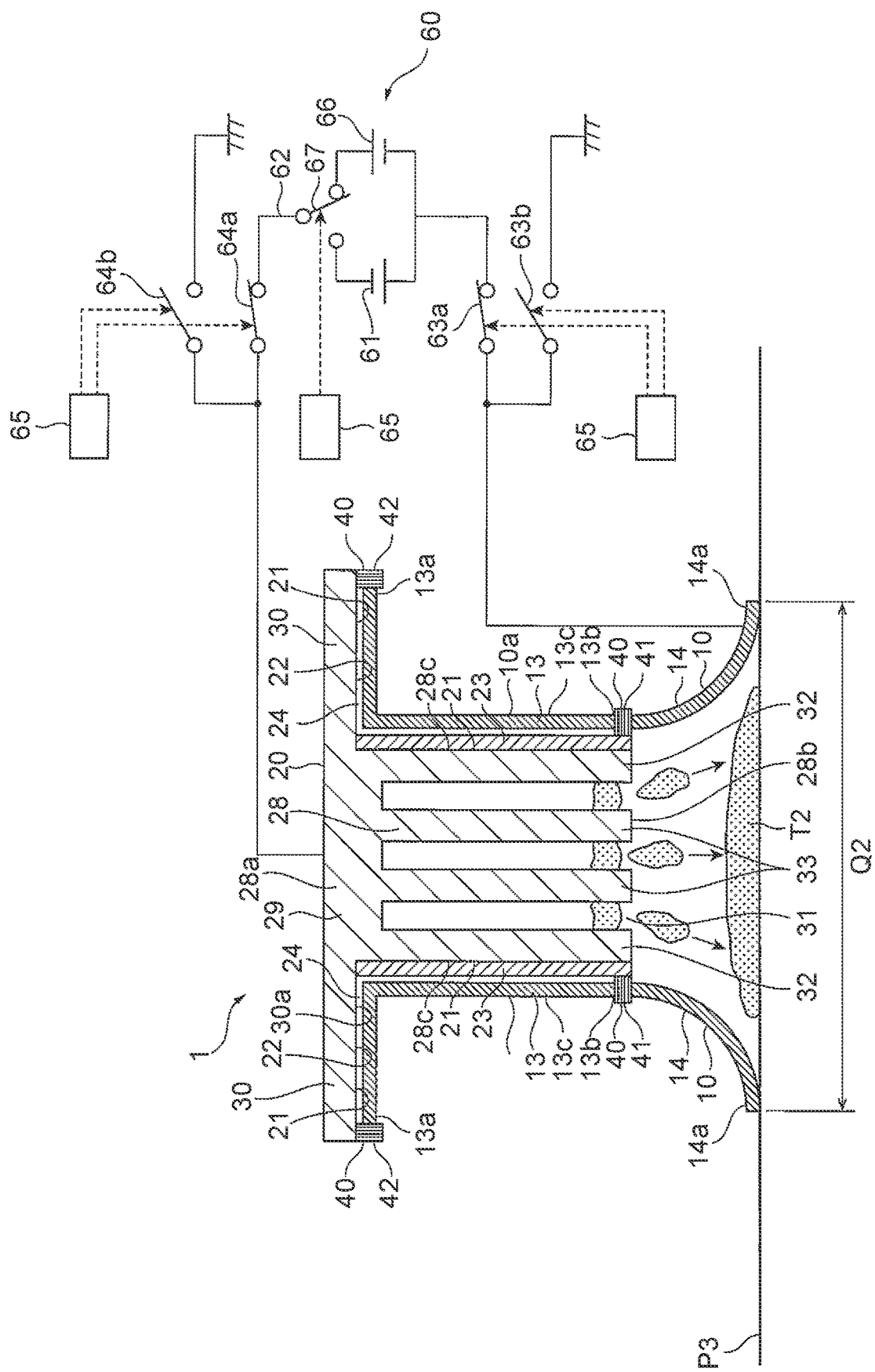
FIG. 9 is a view illustrating the actuator in a case where a reverse voltage is applied after the case shown in FIG. 8.
Figure 10:
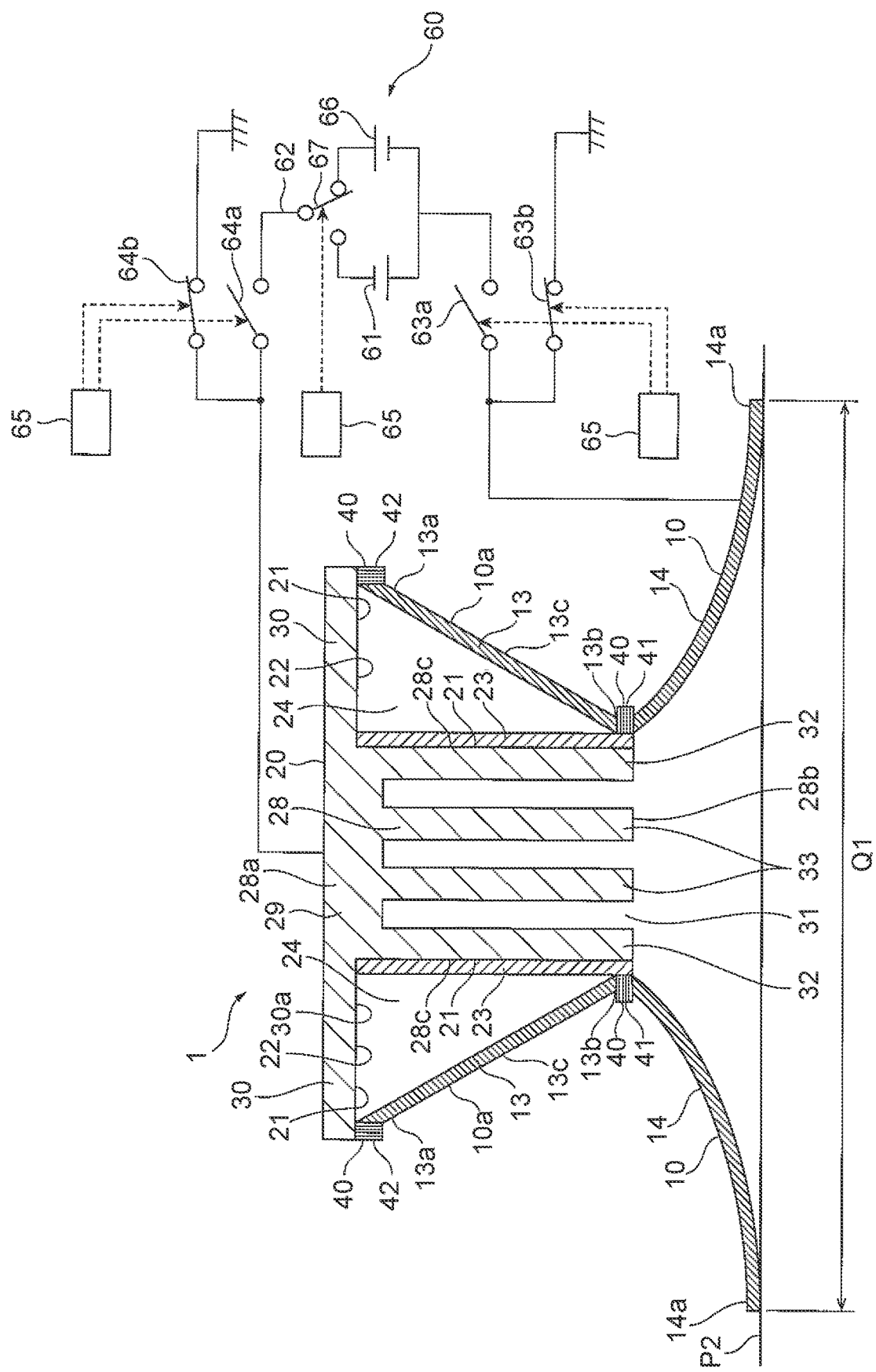
FIG. 10 is a view illustrating the actuator in a case where application of the voltage is stopped after the case shown in FIG. 9.

FIG. 8 is a view illustrating the actuator 1 in a case where a voltage is applied between the flexible electrode 10 and the base electrode 20 shown in FIG. 7. FIG. 9 is a view illustrating the actuator 1 in a case where a reverse voltage is applied after the case shown in FIG. 8. FIG. 10 is a view illustrating the actuator 1 in a case where application of the voltage is stopped after the case shown in FIG. 9.

As shown in FIG. 8, the control units 65 of the drive circuit 60 electrically connect the switch 67 to the power source 61, control the switches 63a, 64a to an ON state, and control switches 63b, 64b to an OFF state. Then, an output voltage of the power source 61 is applied between the flexible electrode 10 and the base electrode 20. In this case, the body part 13 of the flexible electrode 10 deforms so as to approach the outer side surface 28c of the tube part 28 and the lower surface 30a of the flange 30. The main portion 13c of the body part 13 that is the deforming portion 10a deforms in a direction of approaching the outer side surface 28c in the radial direction of the tube part 28 as well as in a direction of approaching the lower surface 30*a* of the flange 30, with the first restraining members 41 and the second restraining members 42 serving as support points.

Here, the first restraining members 41 support the flexible electrode 10 so as to be slidable along the axial direction of the tube part 28. Thus, the skirt part 14 continuing to the body part 13 is pulled in the direction from the other end 28*b* toward the one end 28*a* along the axial direction of the tube part 28. Specifically, by deforming as described above, the main portion 13*c* of the body part 13 that is the deforming portion 10*a* pulls the skirt part 14 in the direction from the other end 28*b* toward the one end 28*a* along the axial direction of the tube part 28. Further, the first restraining members 41 restrain the tube part 28 of the flexible electrode 10 from deforming in the radial direction. Thus, as the main portion 13*c* of the body part 13 pulls the skirt part 14, the leading end 14*a* of the skirt part 14 shifts toward the inner side in the radial direction of the tube part 28, with the first restraining members 41 serving as support points. An area of occupancy that is the area of the surface P2 surrounded by the leading end 14*a* of the skirt part 14 decreases from an area of occupancy Q1 as shown in FIG. 7 in the initial stage before the voltage is applied to an area of occupancy Q2 as shown in FIG. 8 when the voltage is applied.

Thus, the actuator 1 of Embodiment 3 can realize an action of scraping and gathering the target T2 together by the skirt part 14 by converting deformation of the deforming portion 10*a* of the body part 13 into a shift of the leading end 14*a* of the skirt part 14 toward the inner side in the radial direction and using this shift to reduce the area of occupancy of the skirt part 14. The leading end 14*a* of the skirt part 14 can function as an output part that outputs the work of the actuator 1 to the outside.

The lower surface 30*a* of the flange 30 is covered with the insulation layer 22, and the outer side surface 28*c* of the tube part 28 is covered with the insulation layer 23 thicker than the insulation layer 22. A Coulomb force generated between the body part 13 and the insulation layer 22 covering the lower surface 30*a* is greater than a Coulomb force generated between the body part 13 and the insulation layer 23 covering the outer side surface 28*c*. Therefore, the body part 13 deforms so as to approach the lower surface 30*a* of the flange 30 first and then approach the outer side surface 28*c* of the tube part 28. Specifically, the body part 13 deforms so as to approach a part of the opposing surface 21 of the base electrode 20 that is located farther away from the first restraining members 41 before subsequently approaching a part of the opposing surface 21 that is located closer to the first restraining members 41. In this way, the main portion 13*c* of the body part 13 can pull the skirt part 14 reliably and sufficiently in the direction from the other end 28*b* toward the one end 28*a* along the axial direction of the tube part 28. The leading end 14*a* of the skirt part 14 can shift reliably and sufficiently toward the inner side in the radial direction of the tube part 28, with the first restraining members 41 serving as support points. The actuator 1 of Embodiment 3 can more reliably realize the action of gathering the target T2.

When a voltage is applied, the target T2 contacts the skirt part 14. When the target T2 is a conductive liquid, the target T2 assumes electrical charge of the same polarity as the flexible electrode 10, as electrical charge moves from the skirt part 14. In the case shown in FIG. 8, the target T2 assumes positive electrical charge. A Coulomb force is generated between the tube part 28 of the base electrode 20 and the target T2. Due to this Coulomb force, the target T2 is suctioned into the tube part 28 through the opening 31 of the tube part 28. Thus, the actuator 1 of Embodiment 3 can quickly gather more of the target T2. Moreover, by continuously applying a voltage, the actuator 1 of Embodiment 3 can realize an action of storing the suctioned target T2 inside the tube part 28.

After the case shown in FIG. 8, the control unit 65 of the drive circuit 60 electrically connects the switch 67 to the power source 66 as shown in FIG. 9. Then, an output voltage of the power source 66 is applied between the flexible electrode 10 and the base electrode 20. In this case, conversely to the case shown in FIG. 8, the flexible electrode 10 assumes negative electrical charge. Conversely to the case shown in FIG. 8, the base electrode 20 assumes positive electrical charge. As in the case shown in FIG. 8, the main portion 13*c* of the body part 13 that is the deforming portion 10*a* remains in the state of having deformed in the direction of approaching the outer side surface 28*c* of the tube part 28 and the lower surface 30*a* of the flange 30. The leading end 14*a* of the skirt part 14 remains in the state of having shifted toward the inner side in the radial direction. The area of occupancy of the leading end 14*a* of the skirt part 14 remains in the state of having decreased to the area of occupancy Q2.

When the target T2 is a conductive liquid, the polarity of the electrical charge that the tube part 28 of the base electrode 20 assumes and the polarity of the electrical charge that the target T2 stored inside the tube part 28 assumes are the same. Due to an action of a repulsive force against the tube part 28, the target T2 stored inside the tube part 28 is discharged to the outside through the opening 31 of the tube part 28. Here, by discharging the target T2 onto a surface P3 that is a surface located outside the actuator 1 and different from the surface P2, the actuator 1 can move the target T2 from the surface P2 onto the surface P3.

After the case shown in FIG. 9, the control units 65 of the drive circuit 60 control the switches 63*b*, 64*b* to an ON state and control the switches 63*a*, 64*a* to an OFF state as shown in FIG. 10. Then, application of the voltage between the flexible electrode 10 and the base electrode 20 stops. In this case, due to a restoring force of the flexible electrode 10, the main portion 13*c* of the body part 13 that is the deforming portion 10*a* deforms in a direction of separating from the outer side surface 28*c* of the tube part 28 and the lower surface 30*a* of the flange 30 and restores to its initial position as shown in FIG. 7 before the voltage is applied. The leading end 14*a* of the skirt part 14 shifts toward the outer side in the radial direction and restores to its initial position. The area of occupancy of the leading end 14*a* of the skirt part 14 restores to its initial area of occupancy Q1.

Thus, the actuator 1 of Embodiment 3 can realize an action of gathering the target T2 by converting deformation of the deforming portion 10*a* of the body part 13 into a shift of the skirt part 14 constituting the output part. When the target T2 is a conductive liquid, the actuator 1 of Embodiment 3 can realize actions of storing and discharging the target T2. With a concrete output form given to its work, the actuator 1 of Embodiment 3 can realize actions like gathering, storing, and discharging actions that conventional soft actuators have not been able to realize.

Figure 11:
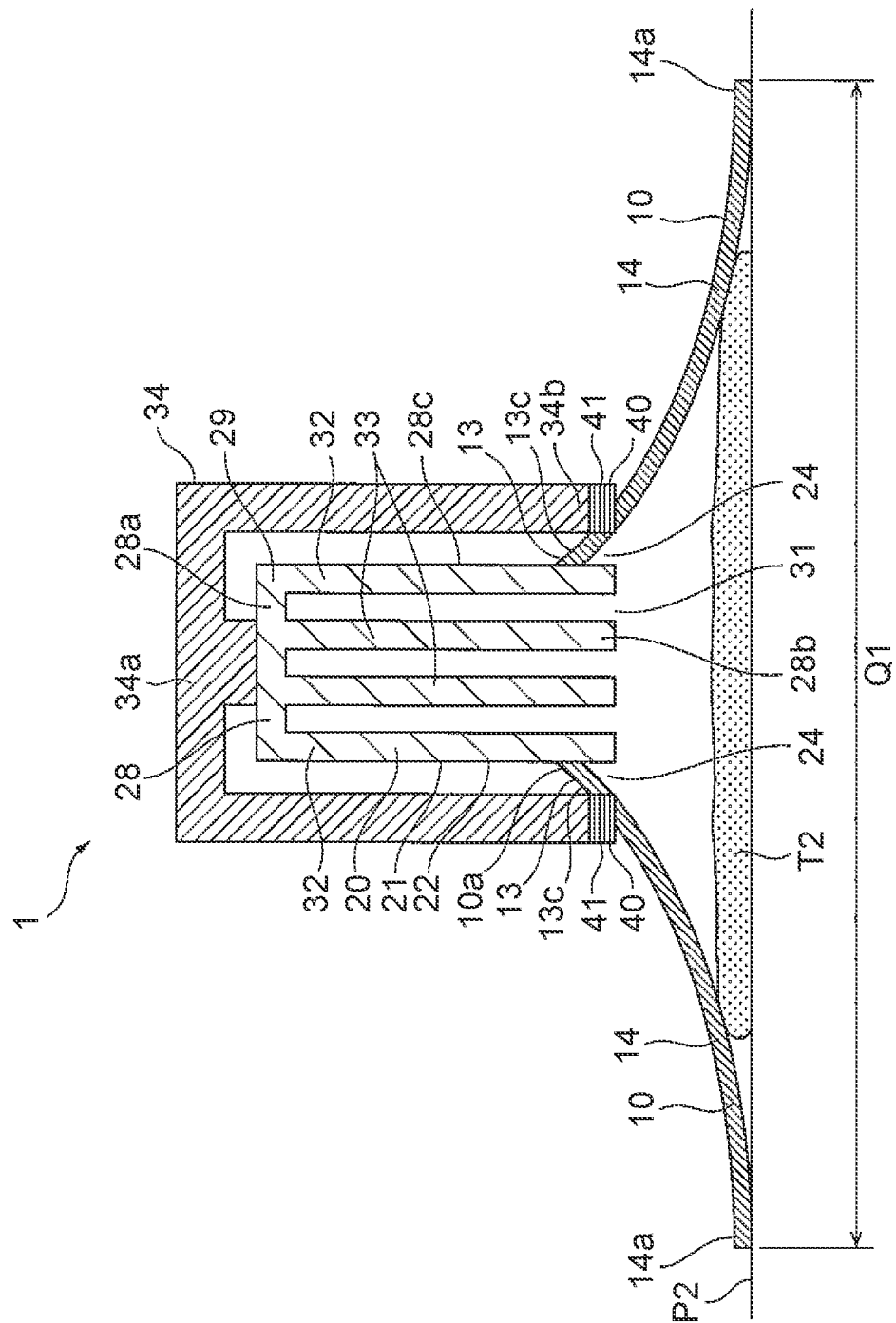
FIG. 11 is a view illustrating another example of the actuator shown in FIG. 7.
Figure 12:
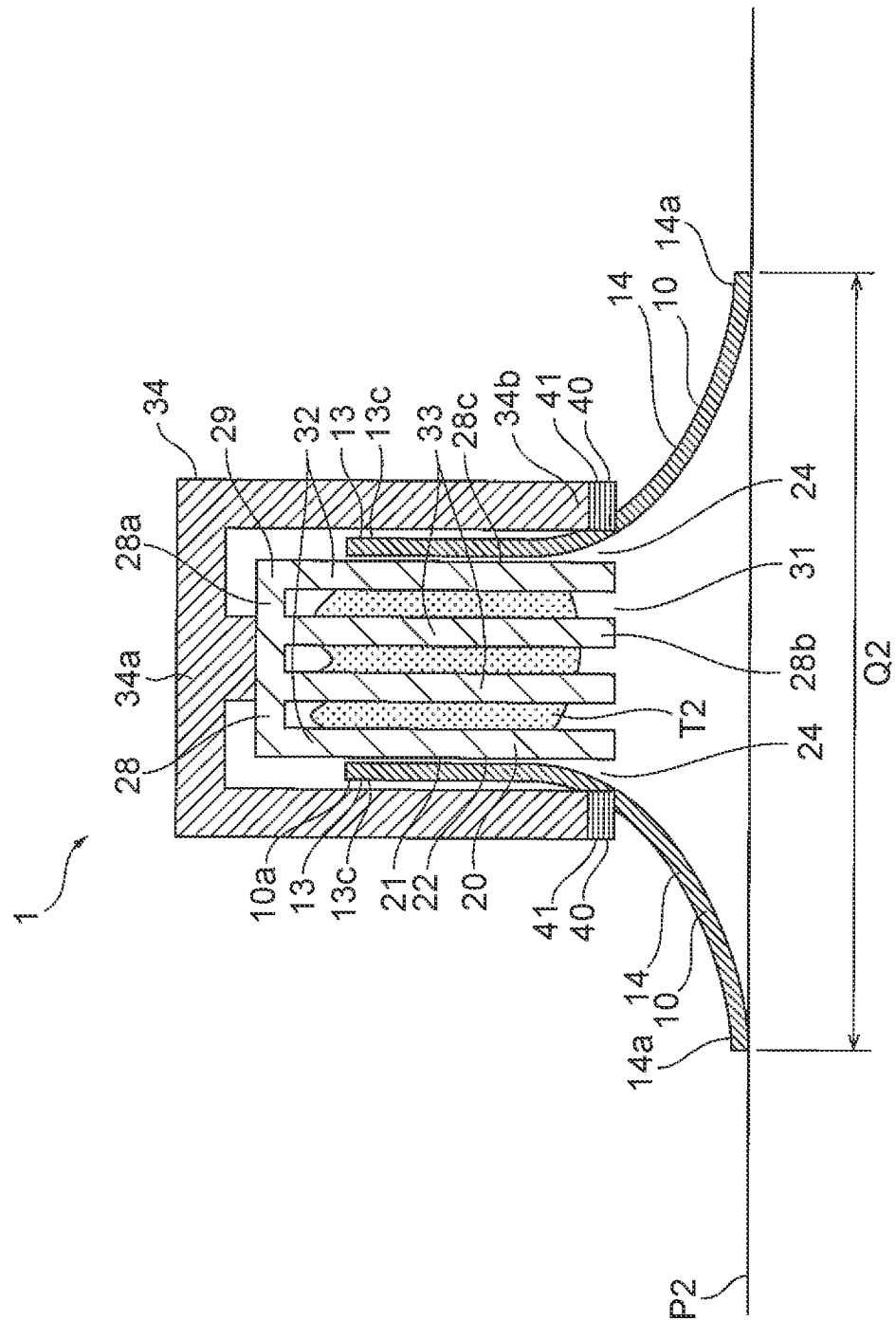
FIG. 12 is a view illustrating the actuator in a case where a voltage is applied between the flexible electrode and the base electrode shown in FIG. 11.

FIG. 11 is a view illustrating another example of the actuator 1 shown in FIG. 7. FIG. 12 is a view illustrating the actuator 1 in a case where a voltage is applied between the flexible electrode 10 and the base electrode 20 shown in FIG. 11.

The actuator 1 of Embodiment 3 should be provided with at least the first restraining members 41, and the second restraining members 42 that fix the base end 13*a* of the body part 13 of the flexible electrode 10 can be omitted as shown in FIG. 11. The actuator 1 shown in FIG. 11 includes a casing 34 that has a shape of a tube closed at one end and houses the tube part 28 of the base electrode 20. The casing 34 is formed by an insulator. The casing 34 extends along the axial direction of the tube part 28. A bottom 34a of the casing 34 is disposed on the side of the one end 28a of the tube part 28. The bottom 34a of the casing 34 is mounted on the bottom 29 of the tube part 28. An edge 34b forming an opening of the casing 34 is disposed on the side of the other end 28b of the tube part 28.

The first restraining members 41 shown in FIG. 11 are mounted on the edge 34b of the casing 34. The first restraining members 41 shown in FIG. 11 are disposed outward of the outer side surface 28c of the tube part 28 in the radial direction of the tube part 28. The first restraining members 41 shown in FIG. 11 restrain the flexible electrode 10 from deforming in the radial direction of the tube part 28. The first restraining members 41 shown in FIG. 11 support the flexible electrode 10 so as to be slidable along the axial direction of the tube part 28. The first restraining members 41 shown in FIG. 11 restrain the flexible electrode 10 on the base electrode 20 through the casing 34.

The body part 13 of the flexible electrode 10 shown in FIG. 11 is supported by the first restraining members 41 so as to face the outer side surface 28c of the tube part 28 in a state of being inclined relatively to the outer side surface 28c. The skirt part 14 shown in FIG. 11 continues to the body part 13 and extends in the axial direction from the first restraining members 41 beyond the other end 28b while expanding to the outer side of the first restraining members 41 in the radial direction of the tube part 28.

The opposing surface 21 of the base electrode 20 shown in FIG. 11 is formed by the outer side surface 28c of the tube part 28. While this is not shown, the base electrode 20 shown in FIG. 11 is divided into a plurality of electrode parts by dividing the outer side surface 28c of the tube part 28 along the axial direction of the tube part 28. A voltage can be individually applied to these electrode parts.

While this is not shown, the drive circuit 60 of the actuator 1 shown in FIG. 11 sequentially applies a voltage to the electrode parts, along the direction from the other end 28b to the one end 28a of the tube part 28. Then, as shown in FIG. 12, the main portion 13c of the body part 13 of the flexible electrode 10 that is the deforming portion 10a deforms so as to approach the outer side surface 28c of the tube part 28 and at the same time shifts in the direction from the other end 28b toward the one end 28a along the axial direction of the tube part 28. The main portion 13c of the body part 13 that is the deforming portion 10a pulls the skirt part 14 in the direction from the other end 28b toward the one end 28a along the axial direction of the tube part 28. As the body part 13 pulls the skirt part 14, the leading end 14a of the skirt part 14 shifts toward the inner side in the radial direction of the tube part 28, with the first restraining members 41 serving as support points.

Thus, like the actuator 1 shown in FIG. 7, the actuator 1 shown in FIG. 11 can realize an action of gathering the target T2 by converting deformation of the deforming portion 10a of the body part 13 into a shift of the skirt part 14 constituting the output part.

Embodiment 4

An actuator 1 of Embodiment 4 will be described using FIG. 13 to FIG. 16. Description of components and actions of the actuator 1 of Embodiment 4 that are the same as in the foregoing embodiments will be omitted.

Figure 13:
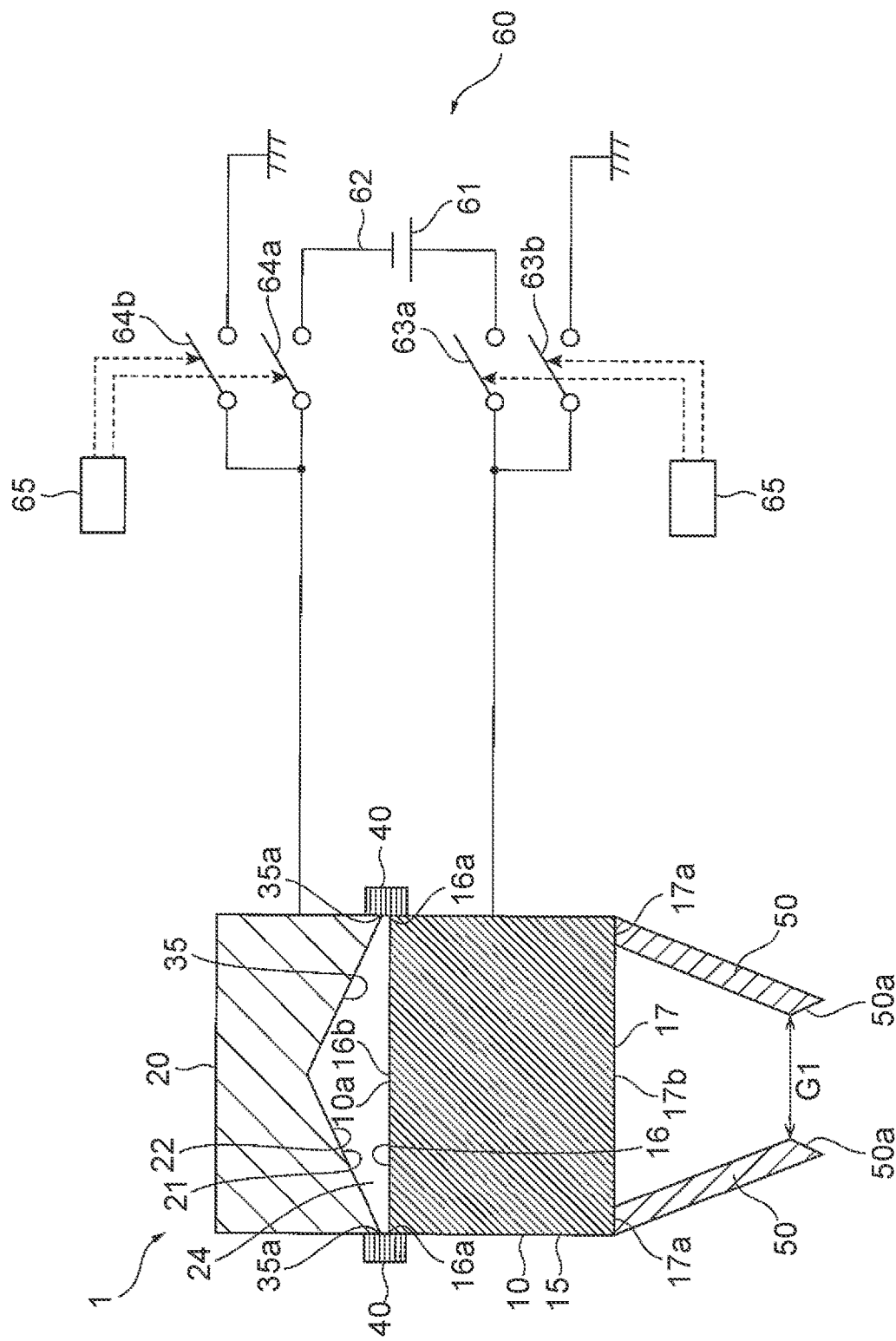
FIG. 13 is a view schematically showing the configuration of an actuator of Embodiment 4.

FIG. 13 is a view schematically showing the configuration of the actuator 1 of Embodiment 4.

By applying a voltage between both electrodes, a flexible electrode 10 and a base electrode 20, the actuator 1 of Embodiment 4 deforms the flexible electrode 10 such that one end surface 16, to be described later, of the flexible electrode 10 approaches a recessed surface part 35, to be described later, of the base electrode 20 (see FIG. 14). Thus, the actuator 1 of Embodiment 4 can realize an action of catching a target by a plurality of rod-shaped members 50 that is mounted on the other end surface 17, to be described later, of the flexible electrode 10.

The base electrode 20 of Embodiment 4 may be formed in a shape of a plate having a recess with ridgelines along the one end surface 16 of the flexible electrode 10. An opposing surface 21 of the base electrode 20 has the recessed surface part 35 that is depressed in a direction of separating from the flexible electrode 10. The recessed surface part 35 is inclined relatively to the one end surface 16. A space 24 is formed between the recessed surface part 35 and the one end surface 16. The recessed surface part 35 may be formed by a surface that is bent into a V-shape in cross-section.

The flexible electrode 10 of Embodiment 4 is formed as a hexahedron 15, such as a rectangular parallelepiped. The flexible electrode 10 has the one end surface 16 that faces the recessed surface part 35 and the other end surface 17 that is located on the opposite side from the one end surface 16 in a direction from the flexible electrode 10 toward the base electrode 20.

The one end surface 16 of the flexible electrode 10 has edges 16a and a main portion 16b that is a portion other than the edges 16a. The edges 16a of the one end surface 16 are portions that are fixed by restraining members 40. The main portion 16b of the one end surface 16 is a portion that is not fixed by the restraining members 40. The main portion 16b of the one end surface 16 is a deforming portion 10a. The other end surface 17 of the flexible electrode 10 includes edges 17a and a main portion 17b that is a portion other than the edges 17a. The rod-shaped members 50 are mounted on the edges 17a of the other end surface 17. The main portion 17b of the other end surface 17 is a portion on which the rod-shaped members 50 are not mounted.

Each rod-shaped member 50 is formed by an insulator. Leading ends 50a of the respective rod-shaped members 50 are disposed at an interval G1 along the other end surface 17. The leading ends 50a of the respective rod-shaped members 50 may be formed in a shape that allows them to easily catch a target, for example, like tweezers.

The restraining members 40 of Embodiment 4 restrain the flexible electrode 10 on the base electrode 20 by fixing the edges 16a of the one end surface 16 of the flexible electrode 10 and edges 35a of the recessed surface part 35 of the base electrode 20 to each other. The restraining members 40 support the edges 16a of the one end surface 16 as fixed ends. The restraining members 40 may be configured similarly to those of Embodiment 1.

Figure 14:
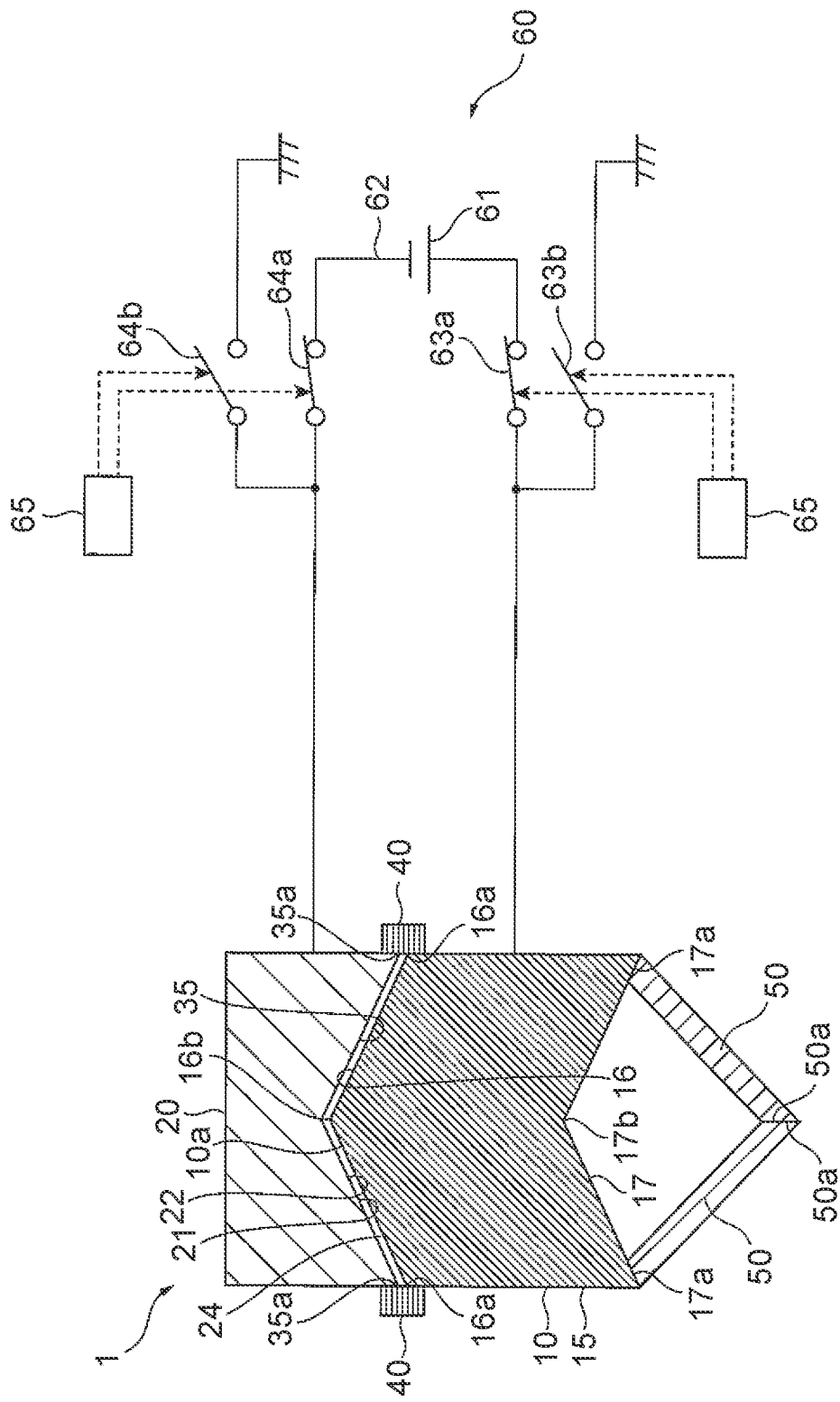
FIG. 14 is a view illustrating the actuator in a case where a voltage is applied between the flexible electrode and the base electrode shown in FIG. 13.

FIG. 14 is a view illustrating the actuator 1 in a case where a voltage is applied between the flexible electrode 10 and the base electrode 20 shown in FIG. 13.

As shown in FIG. 14, control units 65 of a drive circuit 60 control switches 63a, 64a to an ON state and control switches 63b, 64b to an OFF state. Then, a voltage is applied between the flexible electrode 10 and the base electrode 20. In this case, the one end surface 16 of the flexible electrode 10 deforms so as to approach the recessed surface part 35. The main portion 16b of the one end surface 16 that is the deforming portion 10a shifts in a direction of approaching the recessed surface part 35, with the restraining members 40 serving as support points. As the main portion 16b of the one end surface 16 deforms, the main portion 17b of the other end surface 17 of the flexible electrode 10 deforms in the direction of approaching the recessed surface part 35. Each of the rod-shaped members 50 turns so as to reduce the interval G1. Specifically, as the main portion 17b of the other end surface 17 deforms, the leading ends 50a of the respective rod-shaped members 50 shift in a direction of reducing the interval G1. As a result, the leading ends 50a of the respective rod-shaped members 50 can catch a target.

Thus, the actuator 1 of Embodiment 4 can realize an action of catching a target by converting deformation of the deforming portion 10a of the one end surface 16 into a shift of the leading ends 50a of the respective rod-shaped members 50 and using this shift to reduce the interval G1 between the leading ends 50a of the respective rod-shaped members 50. The leading ends 50a of the respective rod-shaped members 50 can function as an output part that outputs the work of the actuator 1 to the outside.

After the case shown in FIG. 14, the control units 65 of the drive circuit 60 control the switches 63b, 64b to an ON state and control the switches 63a, 64a to an OFF state. Then, application of the voltage between the flexible electrode 10 and the base electrode 20 stops. In this case, due to a restoring force of the flexible electrode 10, the main portion 16b of the one end surface 16 that is the deforming portion 10a deforms in a direction of separating from the recessed surface part 35, with the restraining members 40 serving as support points, and restores to its initial position as shown in FIG. 13. As the main portion 16b of the one end surface 16 that is the deforming portion 10a deforms and the main portion 17b of the other end surface 17 deforms, the leading ends 50a of the respective rod-shaped members 50 shift in a direction of increasing the interval G1 and restore to their initial positions. As a result, the leading ends 50a of the respective rod-shaped members 50 can release the target they have caught.

Thus, the actuator 1 of Embodiment 4 can realize an action of catching a target by converting deformation of the deforming portion 10a of the one end surface 16 into a shift of the leading ends 50a of the respective rod-shaped members 50 constituting the output part. With a concrete output form given to its work, the actuator 1 of Embodiment 4 can realize actions like actions of catching and releasing a target that conventional soft actuators have not been able to realize.

Figure 15:
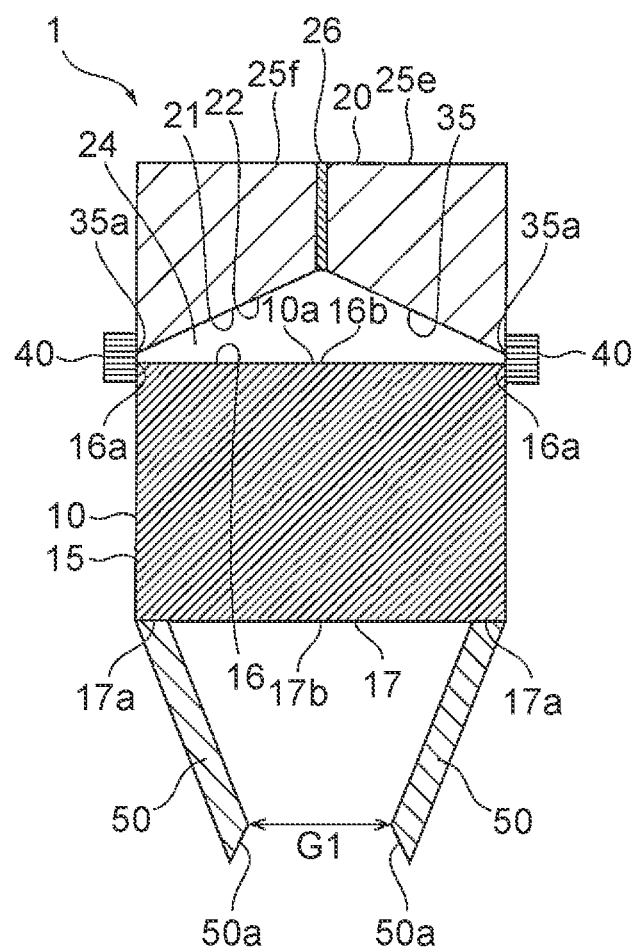
FIG. 15 is a view illustrating another example of the actuator shown in FIG. 13.

FIG. 15 is a view illustrating another example of the actuator 1 shown in FIG. 13.

As shown in FIG. 15, the base electrode 20 of Embodiment 4 may be divided into a plurality of electrode parts 25e, 25f according to positions at which the respective rod-shaped members 50 are mounted. For example, the base electrode 20 may be divided into the electrode parts 25e, 25f such that a plane including a plate-shaped insulation part 26 that divides the opposing surface 21 demarcates each of the rod-shaped members 50. The electrode parts 25e, 25f are insulated from each other by the insulation part 26. The insulation part 26 allows a voltage to be individually applied between each of the electrode parts 25e, 25f and the flexible electrode 10. The control units 65 of the drive circuit 60 can control the magnitude of a voltage to be applied to each of the electrode parts 25e, 25f and control the timings of applying a voltage and stopping the application. Thus, the actuator 1 of Embodiment 4 can accurately control the positions of the leading ends 50a of the respective rod-shaped members 50 and the force with which the leading ends 50a catch the target.

Figure 16:
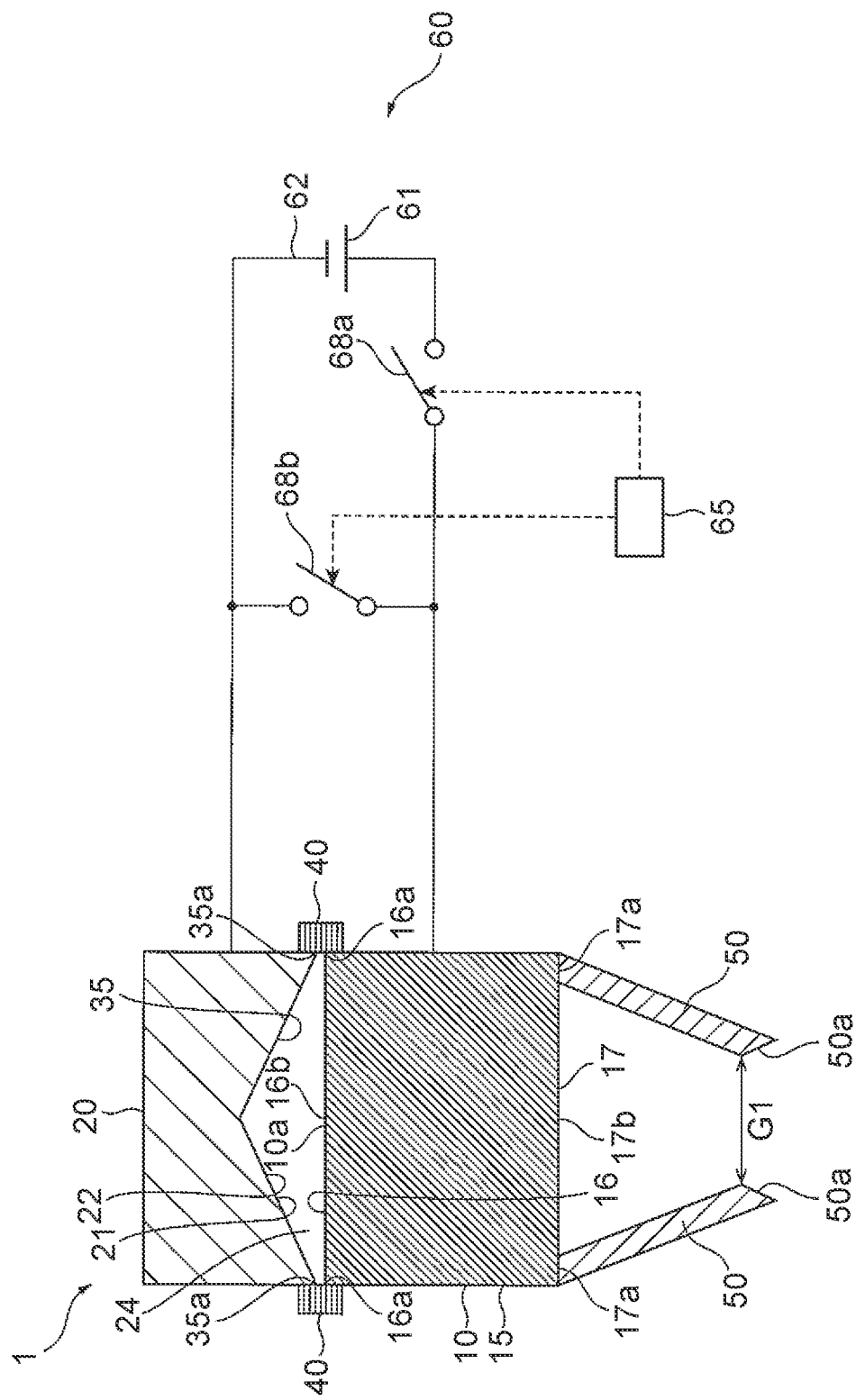
FIG. 16 is a view illustrating another example of the drive circuit shown in FIG. 13.

FIG. 16 is a view illustrating another example of the drive circuit 60 shown in FIG. 13.

As shown in FIG. 16, the drive circuit 60 of Embodiment 4 need not connect the flexible electrode 10 and the base electrode 20 to a frame ground. The drive circuit 60 shown in FIG. 16 has switches 68a, 68b instead of the switches 63a to 64b. In the drive circuit 60 shown in FIG. 16, the flexible electrode 10 and the base electrode 20 are connected to the power source 61 through the switch 68a. The flexible electrode 10 and the base electrode 20 are connected to each other through the switch 68b.

To apply a voltage between the flexible electrode 10 and the base electrode 20, the control unit 65 of the drive circuit 60 shown in FIG. 16 has only to control the switch 68a to an ON state and control the switch 68b to an OFF state. To stop the application of the voltage between the flexible electrode 10 and the base electrode 20, the control unit 65 of the drive circuit 60 shown in FIG. 16 has only to control the switch 68b to an ON state and control the switch 68a to an OFF state. Electrical charge accumulated in each of the flexible electrode 10 and the base electrode 20 moves until neutralized and electrical potentials of the flexible electrode 10 and the base electrode 20 become equal, so that application of the voltage stops.

Thus, the drive circuit 60 shown in FIG. 16 can have a simpler circuit configuration than the drive circuit 60 shown in FIG. 13. The drive circuit 60 shown in FIG. 16 is also applicable to the drive circuits 60 that drive the actuator 1 in embodiments other than Embodiment 4. When the target is not affected by electrical charging, the rod-shaped members 50 may be omitted from the actuator 1 of Embodiment 4 and the flexible electrode 10 may be configured to directly catch the target.

Embodiment 5

An actuator 1 of Embodiment 5 will be described using FIG. 17 and FIG. 18. Description of components and actions of the actuator 1 of Embodiment 5 that are the same as in the foregoing embodiments will be omitted.

Figure 17:
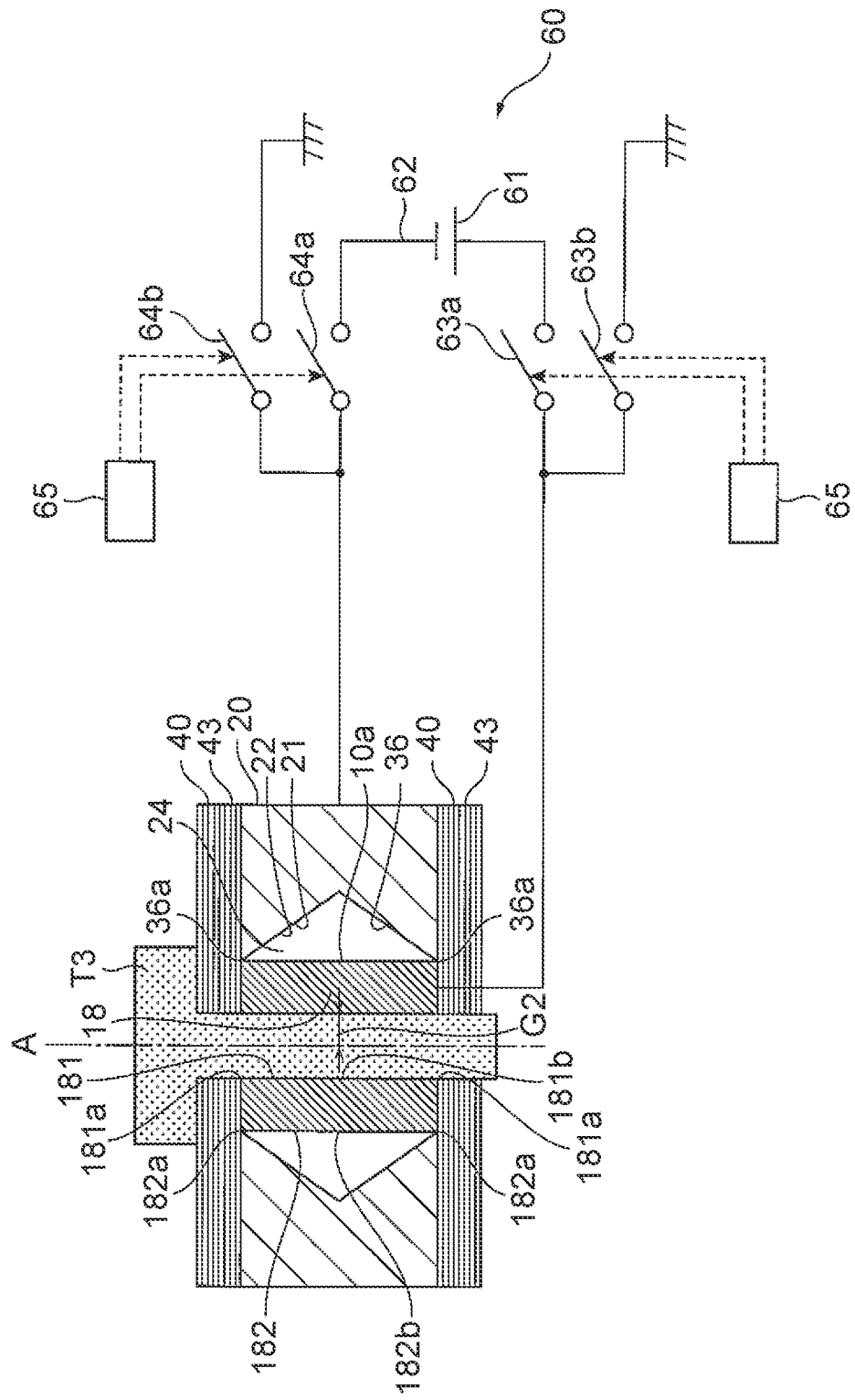
FIG. 17 is a view schematically showing the configuration of an actuator of Embodiment 5.

FIG. 17 is a view schematically showing the configuration of the actuator 1 of Embodiment 5.

By applying a voltage between both electrodes, a flexible electrode 10 and a base electrode 20, the actuator 1 of Embodiment 5 deforms the flexible electrode 10 such that an outer circumferential surface 182, to be described later, of the flexible electrode 10 approaches a recessed surface part 36, to be described later, of the base electrode 20 (see FIG. 18). Thus, the actuator 1 of Embodiment 5 can realize an action of loosening a target T3 tightened by an inner circumferential surface 181, to be described later, of the flexible electrode 10. The target T3 is a member extending in an axial direction of an axis A, such as a pin, a shaft, or a screw.

The flexible electrode 10 of Embodiment 5 is formed as a cylindrical body 18 surrounding the periphery of the predetermined axis A. The flexible electrode 10 has the inner circumferential surface 181 that surrounds the periphery of the axis A, with a gap G2 left between the inner circumferential surface 181 and the axis A in a radial direction intersecting (orthogonally) with the axis A, and the outer circumferential surface 182 that is disposed outward of the inner circumferential surface 181 in the radial direction.

The inner circumferential surface 181 of the flexible electrode 10 is disposed so as to face the axis A. The inner circumferential surface 181 is a surface that contacts the target T3 and tightens the target T3. The inner circumferential surface 181 may be covered with an insulation layer. The inner circumferential surface 181 has edges 181a and a main portion 181b that is a portion other than the edges 181a. The edges 181a of the inner circumferential surface 181 are portions that are fixed by restraining members 40. The main portion 181b of the inner circumferential surface 181 is a portion that is not fixed by the restraining members 40. The outer circumferential surface 182 of the flexible electrode 10 has edges 182a and a main portion 182b that is a portion other than the edges 182a. The edges 182a of the outer circumferential surface 182 are portions that are fixed by the restraining members 40. The main portion 182b of the outer circumferential surface 182 is a portion that is not fixed by the restraining members 40. The main portion 182b of the outer circumferential surface 182 is a deforming portion 10a.

The base electrode 20 of Embodiment 5 is formed as a tubular body that surrounds the outer circumferential surface 182 of the flexible electrode 10 along a circumferential direction of the axis A. The base electrode 20 is disposed so as to face the outer circumferential surface 182 in the radial direction. An opposing surface 21 of the base electrode 20 has the recessed surface part 36 that is depressed in a direction of separating from the outer circumferential surface 182. The recessed surface part 36 is inclined relatively to the outer circumferential surface 182. A space 24 is formed between the recessed surface part 36 and the outer circumferential surface 182. The recessed surface part 36 may be formed by a surface that is bend into a V-shape in cross-section.

The restraining members 40 of Embodiment 5 restrain the flexible electrode 10 on the base electrode 20 by fixing the edges 181a of the inner circumferential surface 181 of the flexible electrode 10, the edges 182a of the outer circumferential surface 182 thereof, and edges 36a of the recessed surface part 36 to one another. The restraining members 40 support the edges 181a of the inner circumferential surface 181 and the edges 182a of the outer circumferential surface 182 as fixed ends. The restraining members 40 may be formed by a pair of plate-shaped members 43. The pair of plate-shaped members 43 extends in the radial direction. The pair of plate-shaped members 43 holds the flexible electrode 10 and the base electrode 20 from both sides in the axial direction of the axis A. The pair of plate-shaped members 43 is provided with through-holes which extend in the axial direction and through which the target T3 can be passed.

Figure 18:
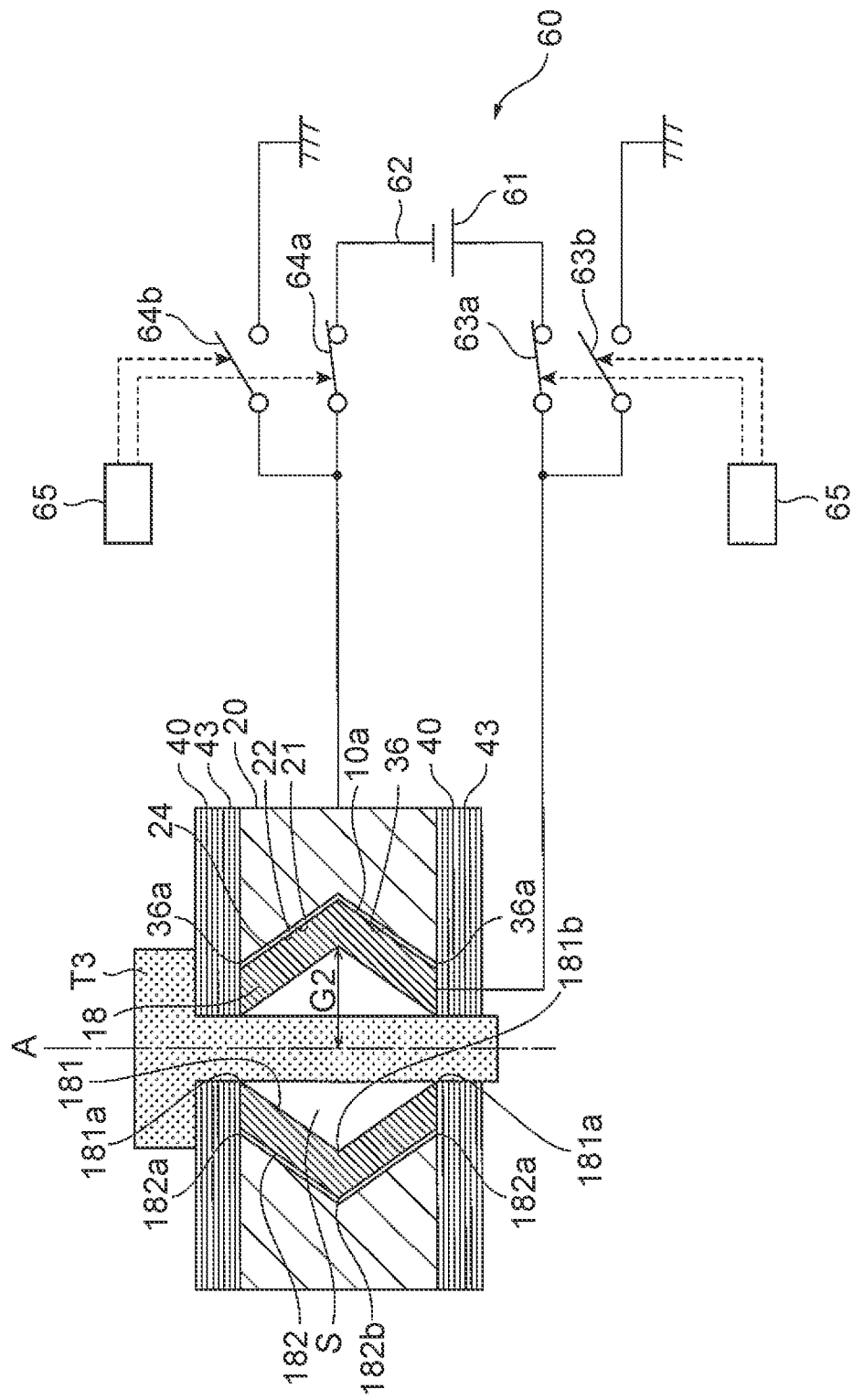
FIG. 18 is a view illustrating the actuator in a case where a voltage is applied between the flexible electrode and the base electrode shown in FIG. 17.

FIG. 18 is a view illustrating the actuator 1 in a case where a voltage is applied between the flexible electrode 10 and the base electrode 20 shown in FIG. 17.

As shown in FIG. 18, control units 65 of a drive circuit 60 control switches 63a, 64a to an ON state and control switches 63b, 64b to an OFF state. Then, a voltage is applied between the flexible electrode 10 and the base electrode 20. In this case, the outer circumferential surface 182 of the flexible electrode 10 deforms so as to approach the recessed surface part 36. The main portion 182b of the outer circumferential surface 182 that is the deforming portion 10a deforms in a direction of approaching the recessed surface part 36 along the radial direction, with positions at which the restraining members 40 support the edges 182a serving as support points. As the main portion 182b of the outer circumferential surface 182 that is the deforming portion 10a deforms, the main portion 181b of the inner circumferential surface 181 of the flexible electrode 10 shifts in the direction of approaching the recessed surface part 36 along the radial direction. The main portion 181b of the inner circumferential surface 181 increases the gap G2 between the inner circumferential surface 181 and the axis A. As a result, a space S is formed between the inner circumferential surface 181 and the target T3. The inner circumferential surface 181 can loosen the tightening of the target T3.

Thus, the actuator 1 of Embodiment 5 can realize an action of loosening the tightened target T3 by converting deformation of the deforming portion 10a of the outer circumferential surface 182 into a shift of the main portion 181b of the inner circumferential surface 181 and using this shift to increase the gap G2 between the inner circumferential surface 181 and the axis A. The main portion 181b of the inner circumferential surface 181 can function as an output part that outputs the work of the actuator 1 to the outside.

After the case shown in FIG. 18, the control units 65 of the drive circuit 60 control the switches 63b, 64b to an ON state and control the switches 63a, 64a to an OFF state. Then, application of the voltage between the flexible electrode 10 and the base electrode 20 stops. In this case, due to a restoring force of the flexible electrode 10, the main portion 182b of the outer circumferential surface 182 that is the deforming portion 10a deforms in the direction of separating from the recessed surface part 36 along the radial direction, with the positions at which the restraining members 40 support the outer circumferential surfaces 182 serving as support points, and restores to its original shape as shown in FIG. 17. As the main portion 182b of the outer circumferential surface 182 that is the deforming portion 10a deforms, the main portion 181b of the inner circumferential surface 181 shifts in a direction of reducing the gap G2 and restores to its initial position. Thus, the inner circumferential surface 181 can tighten the target T3 again.

Thus, the actuator 1 of Embodiment 5 can realize actions of tightening and loosening the target T3 by converting deformation of the deforming portion 10a of the outer circumferential surface 182 into a shift of the main portion 181b of the inner circumferential surface 181 constituting the output part. With a concrete output form given to its work, the actuator 1 of Embodiment 5 can realize actions like actions of tightening and loosening the target T3 that conventional soft actuators have not been able to realize.

The restraining members 40 of Embodiment 5 should at least fix the edges 182a of the outer circumferential surface 182 of the flexible electrode 10 and the edges 36a of the recessed surface part 36 to each other. It is not essential for the restraining members 40 of Embodiment 5 to fix the edges 181a of the inner circumferential surface 181 and the edges 36a of the recessed surface part 36 to each other.

The base electrode 20 of Embodiment 5 may be divided into a plurality of electrode parts that is disposed along the circumferential direction of the axis A. The electrode parts are insulated from one another by an insulation part 26. The insulation part 26 allows a voltage to be individually applied between each of the electrode parts and the flexible electrode 10. The control units 65 of the drive circuit 60 can control the magnitude of a voltage to be applied to each of the electrode parts and control the timings of applying a voltage and stopping the application. Further, the actuator 1 of Embodiment 5 may have a plurality of sets of flexible electrode 10 and base electrode 20 that is disposed along the circumferential direction of the axis A, with each set consisting of one flexible electrode 10 and one base electrode 20. The flexible electrodes 10 each constituting a part of one set have a shape obtained by dividing the cylindrical body 18 surrounding the periphery of the axis A into parts corresponding to the respective sets along the circumferential direction of the axis A. The base electrodes 20 each constituting a part of one set have a shape obtained by dividing the tubular body surrounding the outer circumferential surface 182 of the flexible electrode 10 into parts corresponding to the respective sets along the circumferential direction of the axis A. A voltage can be individually applied between the flexible electrode 10 and the base electrode 20 constituting each set. A plurality of drive circuits 60 may be provided so as to correspond to the respective sets. The control units 65 of each drive circuit 60 can control the magnitude of a voltage to be applied to the corresponding set and control the timings of applying a voltage and stopping the application. Thus, the actuator 1 of Embodiment 5 can accurately control the position of the main portion 181*b* of the inner circumferential surface 181 of each flexible electrode 10 and the force with which the inner circumferential surface 181 of each flexible electrode 10 tightens the target T3.

Embodiment 6

An actuator 1 of Embodiment 6 will be described using FIG. 19 and FIG. 20. Description of components and actions of the actuator 1 of Embodiment 6 that are the same as in the foregoing embodiments will be omitted.

Figure 19:
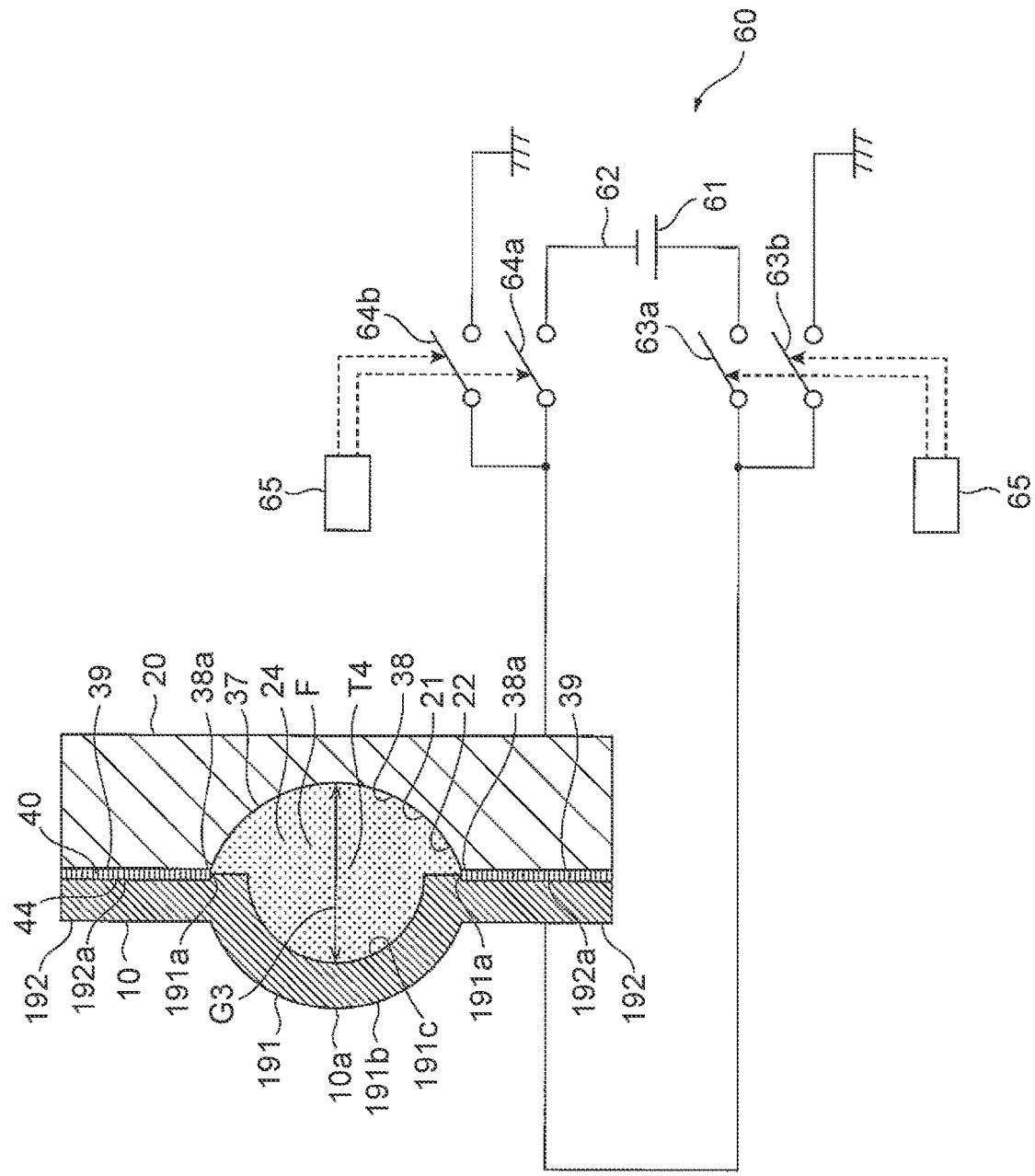
FIG. 19 is a view schematically showing the configuration of an actuator of Embodiment 6.

FIG. 19 is a view schematically showing the configuration of the actuator 1 of Embodiment 6.

By applying a voltage between both electrodes, a flexible electrode 10 and a base electrode 20, the actuator 1 of Embodiment 6 deforms the flexible electrode 10 such that a flow passage wall 191, to be described later, of the flexible electrode 10 approaches a recessed surface part 38, to be described later, of the base electrode 20 (see FIG. 20). Thus, the actuator 1 of Embodiment 6 can realize an action of discharging a target T4 from inside a flow passage F formed by the flow passage wall 191 and the recessed surface part 38. The target T4 is a gas, a liquid, a powder, or the like.

The base electrode 20 of Embodiment 6 may be formed in a shape of a plate provided with a groove 37 having a predetermined length. An opposing surface 21 of the base electrode 20 has the recessed surface part 38 constituting the groove 37 and flat surface parts 39 around the groove 37. The recessed surface part 38 is depressed in a direction of separating from the flexible electrode 10. The recessed surface part 38 extends in an extension direction of the groove 37. The recessed surface part 38 may be formed by a surface that is curved in cross-section. The flat surface parts 39 continue to edges 38*a* of the recessed surface part 38. The flat surface parts 39 spread in the extension direction of the groove 37 and in a direction intersecting with the groove 37.

The flexible electrode 10 of Embodiment 6 may be formed in a shape of a plate provided with the semi-tubular flow passage wall 191. The flexible electrode 10 has the flow passage wall 191 corresponding to the groove 37 and plate parts 192 around the flow passage wall 191. The flow passage wall 191 covers the recessed surface part 38, with a gap G3 left between the flow passage wall 191 and the recessed surface part 38. A space 24 is formed between the flow passage wall 191 and the recessed surface part 38. The space 24 functions as the flow passage F of the target T4. Thus, together with the recessed surface part 38, the flow passage wall 191 forms the flow passage F in the gap G3. The flow passage wall 191 extends in the extension direction of the groove 37. The flow passage wall 191 may be formed in such a shape as to fit into the recessed surface part 38 when deforming so as to approach the recessed surface part 38 upon application of a voltage.

The flow passage wall 191 has edges 191*a* and a main portion 191*b* that is a portion other than the edges 191*a*. The edges 191*a* of the flow passage wall 191 are portions that are fixed by restraining members 40. The main portion 191*b* of the flow passage wall 191 is a portion that is not fixed by the restraining members 40. The main portion 191*b* of the flow passage wall 191 is a deforming portion 10*a*. An inner surface 191*c* of the flow passage wall 191 may be covered with an insulation layer. The plate parts 192 continue to the edges 191*a* of the flow passage wall 191. The plate parts 192 spread in the extension direction of the groove 37 and in a direction intersecting with the groove 37. Inner surfaces 192*a* of the plate parts 192 face the flat surface parts 39 of the base electrode 20.

The restraining members 40 of Embodiment 6 restrain the flexible electrode 10 on the base electrode 20 by fixing the edges 191*a* of the flow passage wall 191 and the edges 38*a* of the recessed surface part 38 to each other. The restraining members 40 support the edges 191*a* of the flow passage wall 191 as fixed ends. The restraining members 40 may be formed by adhesives 44 having insulating properties. The adhesives 44 bond the inner surfaces 192*a* of the plate parts 192 of the flexible electrode 10 and the flat surface parts 39 of the base electrode 20 together.

Figure 20:
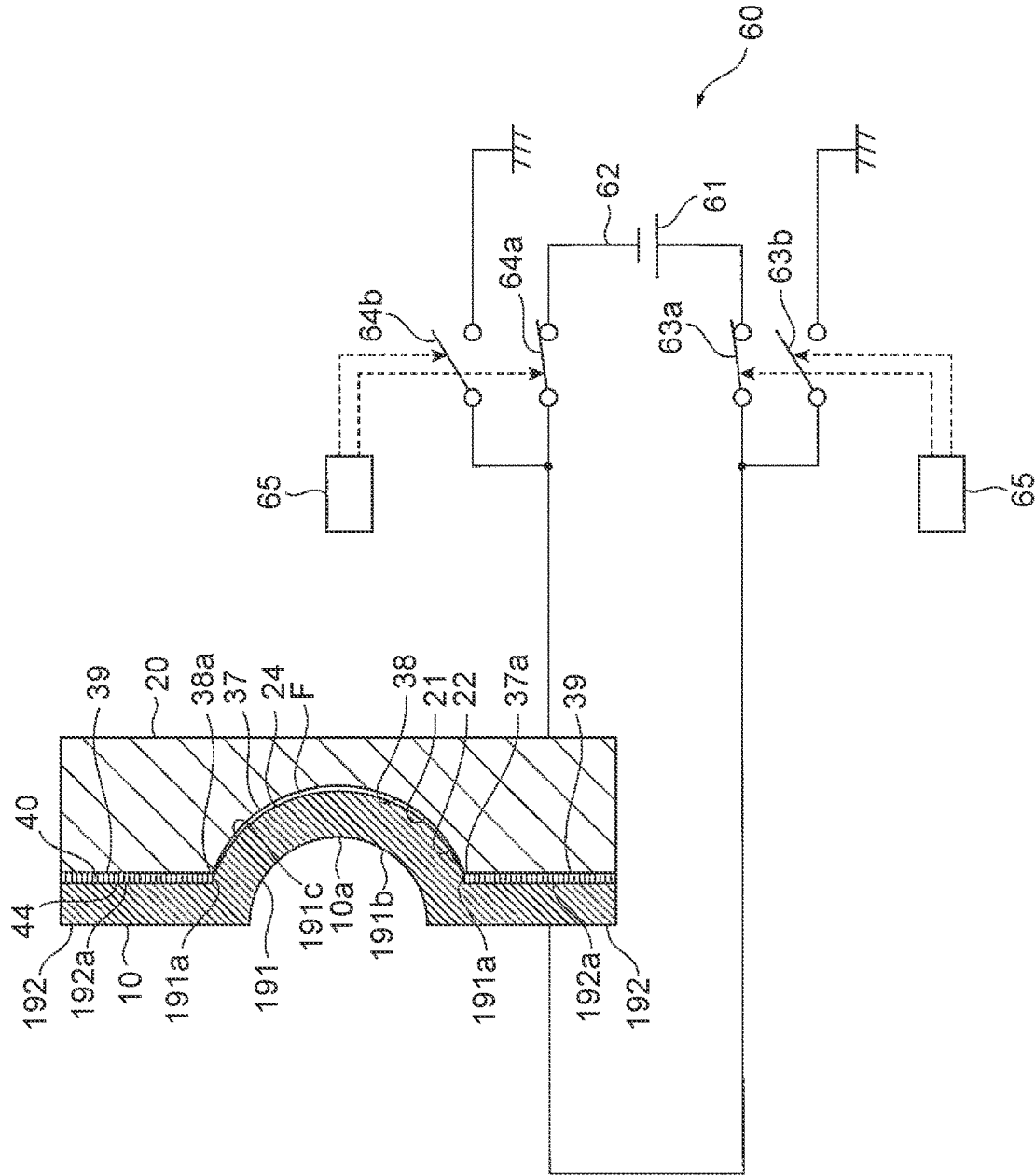
FIG. 20 is a view illustrating the actuator in a case where a voltage is applied between the flexible electrode and the base electrode shown in FIG. 19.

FIG. 20 is a view illustrating the actuator 1 in a case where a voltage is applied between the flexible electrode 10 and the base electrode 20 shown in FIG. 19.

As shown in FIG. 20, control units 65 of a drive circuit 60 control switches 63*a*, 64*a* to an ON state and control switches 63*b*, 64*b* to an OFF state. Then, a voltage is applied between the flexible electrode 10 and the base electrode 20. In this case, the flow passage wall 191 of the flexible electrode 10 deforms so as to approach the recessed surface part 38. The main portion 191*b* of the flow passage wall 191 that is the deforming portion 10*a* deforms in a direction of approaching the recessed surface part 38 along a direction intersecting with the groove 37, with positions at which the restraining members 40 support the edges 191*a* serving as support points. The main portion 191*b* of the flow passage wall 191 that is the deforming portion 10*a* reduces the gap G3 between the flow passage wall 191 and the recessed surface part 38. As a result, the volume of the flow passage F decreases. The flow passage wall 191 allows the target T4 to be discharged from the flow passage F.

Thus, the actuator 1 of Embodiment 6 can realize an action of discharging the target T4 from inside the flow passage F by using deformation of the deforming portion 10*a* of the flow passage wall 191 to reduce the gap G3 between the flow passage wall 191 and the recessed surface part 38 and to thereby reduce the volume of the flow passage F. The deforming portion 10*a* of the flow passage wall 191 can function as an output part that outputs the work of the actuator 1 to the outside.

After the case shown in FIG. 20, the control units 65 of the drive circuit 60 control the switches 63*b*, 64*b* to an ON state and control the switches 63*a*, 64*a* to an OFF state. Then, application of the voltage between the flexible electrode 10 and the base electrode 20 stops. In this case, due to a restoring force of the flexible electrode 10, the main portion 191*b* of the flow passage wall 191 that is the deforming portion 10*a* deforms in a direction of separating from the recessed surface part 38 along the direction intersecting with the groove 37, with the positions at which the restraining members 40 support the edges 191*a* serving as support points, and restores to its original shape as shown in FIG. 19. The gap G3 increases and restores to its initial length before the voltage is applied. As a result, the volume of the flow passage F increases. The flow passage wall 191 allows the target T4 to be suctioned into the flow passage F.

Thus, the actuator 1 of Embodiment 6 can realize actions of discharging and suctioning the target T4 from and into the flow passage F, i.e., an action of a pump, by using deformation of the deforming portion 10*a* of the flow passage wall 191 to reduce or increase the volume of the flow passage F. With a concrete output form given to its work, the actuator 1 of Embodiment 6 can realize an action like an action of a pump that conventional soft actuators have not been able to realize.

As has been described above, the actuator 1 is an actuator having the flexible electrode 10 that has flexibility and the base electrode 20 of which the opposing surface 21 facing the flexible electrode 10 is covered with the insulation layer 22, and configured such that, when a voltage is applied between these electrodes, the flexible electrode 10 deforms so as to approach the opposing surface 21. The actuator 1 includes the restraining members 40 that restrain the flexible electrode 10 on the base electrode 20. The flexible electrode 10 has the deforming portion 10*a* that deforms when a voltage is applied between the electrodes. The deforming portion 10*a* deforms in a direction of approaching the opposing surface 21, with the restraining members 40 serving as support points.

Thus configured, the actuator 1 can output its work in various forms, such as shifting a portion of the flexible electrode 10 other than the deforming portion 10*a*, another member of the actuator 1, or a target as the deforming portion 10*a* deforms, and using a space created as the deforming portion 10*a* deforms. The actuator 1 can realize various actions that conventional soft actuators have not been able to realize, such as a jumping action, a throwing action, gathering, storing, and discharging actions, catching and releasing actions, tightening and loosening actions, and an action of a pump. With a concrete output form given to its work, the actuator 1 can realize various actions.

While embodiments of the disclosure have been described in detail above, the disclosure is not limited to these embodiments and various changes can be made thereto within a range that does not depart from the gist of the disclosure described in the claims. In the disclosure, components of one embodiment may be added to components of another embodiment, or components of one embodiment may be exchanged with those of another embodiment, or some components of one embodiment may be omitted.

What is claimed is:

1. An actuator having a flexible electrode that has flexibility and a base electrode of which an opposing surface facing the flexible electrode is covered with an insulation layer, the actuator being configured such that, when a voltage is applied between the flexible electrode and the base electrode, the flexible electrode deforms so as to approach the opposing surface, wherein:
   the actuator includes a restraining member that restrains the flexible electrode on the base electrode;
   the flexible electrode has a deforming portion that deforms when the voltage is applied between the flexible electrode and the base electrode; and
   the deforming portion deforms towards the opposing surface, with the restraining member serving as a support point;
   wherein:
   the base electrode has a tube part that is closed at one end and open at the other end;
   an outer side surface of the tube part is the opposing surface of the base electrode;
   the restraining member is disposed outward of the outer side surface of the tube part in a radial direction intersecting with an axial direction of the tube part, and restrains the flexible electrode from deforming in the radial direction as well as supports the flexible electrode so as to be slidable along the axial direction;
   the flexible electrode has a body part that is supported by the restraining member so as to face the outer side surface in a state of being inclined relatively to the outer side surface, and a skirt part that continues to the body part and extends in the axial direction from the restraining member beyond the other end while expanding to an outer side of the restraining member in the radial direction;
   the body part has the deforming portion;
   when the voltage is applied, the deforming portion of the body part deforms towards the outer side surface along the radial direction, with the restraining member serving as a support point, so as to pull the skirt part in a direction from the other end toward the one end along the axial direction; and
   as the body part pulls the skirt part, a leading end of the skirt part shifts toward an inner side in the radial direction, with the restraining member serving as a support point.

2. An actuator having a flexible electrode that has flexibility and a base electrode of which an opposing surface facing the flexible electrode is covered with an insulation layer, the actuator being configured such that, when a voltage is applied between the flexible electrode and the base electrode, the flexible electrode deforms so as to approach the opposing surface, wherein:
   the actuator includes a restraining member that restrains the flexible electrode on the base electrode;
   the flexible electrode has a deforming portion that deforms when the voltage is applied between the flexible electrode and the base electrode; and
   the deforming portion deforms towards the opposing surface, with the restraining member serving as a support point,
   wherein:
   the opposing surface of the base electrode has a recessed surface part that is depressed away from the flexible electrode;
   the flexible electrode has one end surface that faces the recessed surface part and the other end surface that is located on the opposite side from the one end surface;
   a plurality of rod-shaped members is mounted on the other end surface of the flexible electrode;
   leading ends of the respective rod-shaped members are disposed at intervals along the other end surface;
   the restraining member restrains the flexible electrode on the base electrode by fixing an edge of the one end surface and an edge of the recessed surface part to each other;
   the one end surface has the deforming portion;
   when the voltage is applied, the deforming portion of the one end surface deforms towards the recessed surface part, with the restraining member serving as a support point;
   as the one end surface deforms, the other end surface deforms towards the recessed surface part; and
   as the other end surface deforms, the leading ends of the respective rod-shaped members shift in a direction that reduces the intervals.

3. An actuator having a flexible electrode that has flexibility and a base electrode of which an opposing surface facing the flexible electrode is covered with an insulation layer, the actuator being configured such that, when a voltage is applied between the flexible electrode and the base electrode, the flexible electrode deforms so as to approach the opposing surface, wherein:

- the actuator includes a restraining member that restrains the flexible electrode on the base electrode;
- the flexible electrode has a deforming portion that deforms when the voltage is applied between the flexible electrode and the base electrode; and
- the deforming portion deforms towards the opposing surface, with the restraining member serving as a support point, wherein:
- the flexible electrode has an inner circumferential surface that surrounds a periphery of a predetermined axis with a gap left between the inner circumferential surface and the axis in a radial direction intersecting with the axis, and an outer circumferential surface that is disposed outward of the inner circumferential surface in the radial direction;
- the base electrode is disposed so as to face the outer circumferential surface in the radial direction;
- the opposing surface of the base electrode has a recessed surface part that is depressed away from the outer circumferential surface;
- the restraining member restrains the flexible electrode on the base electrode by fixing an edge of the outer circumferential surface and an edge of the recessed surface part to each other;
- the outer circumferential surface has the deforming portion;
- when the voltage is applied, the deforming portion of the outer circumferential surface deforms towards the recessed surface part along the radial direction, with the restraining member serving as a support point; and
- as the outer circumferential surface deforms, the inner circumferential surface shifts towards the recessed surface part along the radial direction so as to increase the gap.

* * * * *